US 6,662,213 B1

(12) United States Patent
Xie et al.

(10) Patent No.: US 6,662,213 B1
(45) Date of Patent: Dec. 9, 2003

(54) SYSTEM AND METHOD FOR ENSURING DELIVERY OF A SINGLE COMMUNICATION BETWEEN NODES

(75) Inventors: Ying Xie, San Jose, CA (US); Madhusudhan K. Talluri, Fremont, CA (US); Skef F. Iterum, San Francisco, CA (US); Kenneth W. Shirriff, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/480,010

(22) Filed: Jan. 10, 2000

(51) Int. Cl.[7] .............................................. G06F 15/16
(52) U.S. Cl. ...................................... 709/206; 709/315
(58) Field of Search ................................ 709/237, 313, 709/314, 315, 206, 205; 370/94, 241

(56) References Cited

U.S. PATENT DOCUMENTS

| | | | | |
|---|---|---|---|---|
| 4,617,657 A | * | 10/1986 | Drynan et al. | 370/394 |
| 4,999,834 A | * | 3/1991 | Leo et al. | 370/241 |
| 5,036,518 A | * | 7/1991 | Tseung | 714/748 |
| 5,245,616 A | * | 9/1993 | Olson | 714/748 |
| 5,446,901 A | * | 8/1995 | Owicki et al. | 711/154 |
| 5,450,425 A | * | 9/1995 | Gunn et al. | 714/819 |
| 5,617,561 A | * | 4/1997 | Blaauw et al. | 703/26 |
| 6,125,386 A | * | 9/2000 | Cho | 709/205 |
| 6,182,086 B1 | * | 1/2001 | Lomet et al. | 707/202 |
| 6,233,248 B1 | * | 5/2001 | Sautter et al. | 370/465 |
| 6,247,059 B1 | * | 6/2001 | Johnson et al. | 709/237 |
| 6,289,372 B1 | * | 9/2001 | Vyaznikov | 709/206 |
| 6,401,136 B1 | * | 6/2002 | Britton et al. | 709/314 |

FOREIGN PATENT DOCUMENTS

EP      0 858 191 A2      8/1998

* cited by examiner

Primary Examiner—Bunjob Jaroenchonwanit
(74) Attorney, Agent, or Firm—Park, Vaughan & Fleming LLP

(57) ABSTRACT

A system and method are provided for ensuring delivery of a communication from one computer system or node to another. A first node includes an object handler, such as an ORB (Object Request Broker), that receives object references from higher-level services operating on the first node, wherein the referenced object resides on a second node. The first node's object handler generates a message to an object handler on the second node and attempts to send the message to the second node through a transport module. The message is assigned a unique identifier, such as a sequence number. If the first object handler receives an uncertain status concerning the message (e.g., other than a certain success or failure), it issues a query to the second node to determine if the message was received. If the query is received by the second object handler before the message itself is received, the message is considered lost or rescinded by the first node. The first node stores the identifier so that it will not be re-assigned to another message and the message is then re-sent with a different identifier. The second object handler notes the identifier and status of the rescinded message and will discard any message having that identifier that is received. The second node includes two or more data structures to track the status of communications sent from the first node. The first node, in addition to a collection of identifiers of lost messages, may also record the status of communications it attempts to send and may also note the identifiers of messages that could not be transmitted (e.g., because of communication link errors).

52 Claims, 14 Drawing Sheets

SYSTEM AND METHOD FOR ENSURING DELIVERY OF A SINGLE COMMUNICATION BETWEEN NODES

BACKGROUND

This invention relates to the field of computer systems. More specifically, a system, article of manufacture and methods are provided for ensuring delivery of messages between computer nodes of a multi-node environment.

Computer systems exchange communications for numerous reasons. One computer system (e.g., a web server) may be configured to service information requests from and provide data to another computer system (e.g., a client). In other environments, such as closely coupled configurations of computer systems, multiple nodes may be inter-connected and cooperate to share access to one or more common resources (e.g., a storage device, a communication device, a network service).

In virtually all environments in which computer systems communicate there is a need to ensure delivery of the communications. Systems in many environments, particularly those in which the systems are distributed (e.g., a network), employ standard communication protocols such as TCP/IP (Transport Control Protocol/Internet Protocol) to maintain uniform communication formats and to perform flow control, error correction and other features. A standard communication protocol such as TCP/IP, however, often incorporates many features not needed in less-distributed, customized, or specialized environments.

For example, in a closely coupled environment such as a cluster, computer systems may be in proximity to one another and thus have no need for many of the services/benefits of a standard network communication protocol for all of its intra-cluster communications. A customized format may be more efficient, for example, when the nodes are directly connected to each other, wherein extraneous protocol data or features may be omitted for the sake of communicating more information in less time.

However, in any type of environment in which computers exchange communications it is still necessary to ensure that information, data requests and other messages sent from one node to another are successfully received. A standard protocol such as TCP may employ a timeout feature whereby a message is automatically re-sent after a certain period of time if a destination node does not acknowledge its receipt. This scheme may result in the destination node receiving multiple copies of a single message. This may decrease the efficiency of the communication medium and, because the destination node must process and act on each message, impact operations on the destination node. Additionally, it may be undesirable for the destination node to carry out, multiple times, whatever action may be required by the message.

Using timeouts as part of a method to ensure delivery of communications may be even more inefficient in specialized environments such as computer clusters. Communication links between nodes in a cluster are often relatively short in length and are frequently dedicated to a limited number of devices. Thus, applying a timeout feature on such a link would tend to have a negative effect on communication throughput. In addition, it may be even more critical in a cluster that a message only be received and applied once on a destination node. For example, in a cluster in which access to a resource is managed by one node, a request to alter data on the resource should only be applied once. Thus, re-sending a request numerous times would be detrimental, even in a situation in which the node controlling the resource failed and was replaced by another node.

Thus, it important to ascertain the status of a message sent from one computer node to another, so that appropriate corrective steps may be taken if the message is lost. However, the transport mechanism of a computer node (e.g., a module that applies TCP) may be unable to accurately determine the status of a message and/or take the necessary steps to ensure its delivery. In particular, the transport mechanism or module in a specialized environment such as a cluster may be of a custom design and may not be configured to automatically re-send a message that may have been lost.

A transport mechanism of a computer node that originates a communication may be able to identify or report clear successes (e.g., to an originator of the communication), as when the receiving node acknowledges receipt of the communication. And the transport mechanism may be able to report clear failures, as when the mechanism fails to transmit the communication. However, the mechanism may be unable to characterize instances in which it transmits a communication but does not receive an acknowledgement. In these cases it may fall to some module above the transport mechanism (e.g., the originator) to determine if the communication was successfully received at the other node. It may also be advantageous for the originator of a communication to ensure its delivery in order to save the recipient of the communication from having to take action on several copies of the communication.

In some existing methods of communicating between computer nodes, an originating node may send multiple copies of a transmission to a destination node to ensure that at least one is received (e.g., particularly if an initial copy is lost). Systems employing these methods usually just discard extra copies at the destination node and it does not matter which copy is actually processed at the destination. However, some computing environments require communications between nodes to be highly reliable or accountable. For example, in an object-oriented computing environment in which references to an object are tracked or monitored, a node's resources may be allocated or tied up until all references (e.g., including communications to/from other nodes) to the object are resolved. In such an environment it is necessary to ensure that only one version of a communication that references a particular object is successfully sent to and received at a destination node, and to know which version of the communication was successful, so that a node's object references can be accurately managed.

Thus, what is needed is a system and method of actively ensuring delivery of a single message or communication from one node to another. In particular, such a system and method should be able to ensure delivery in situations in which a transport mechanism cannot assure the message originator that the message failed or succeeded. Such a system and method may be particularly suited to closely coupled and/or highly available computing environments in which it is desirable to avoid repeating the message, but would be useful in any computing environment in which a computing device's transport mechanism is unable to ensure delivery of a communication.

SUMMARY

In one embodiment of the invention a system and methods are provided for ensuring a single communication or message from an object handler on one node is delivered to an object handler on a second node.

In this embodiment an object handler on one node receives an object reference from a higher-level service (e.g., a file system, a network service) concerning an object on a second node. The object handler generates a message or other communication concerning the reference, assigns it a unique identifier (e.g., a sequence number) and passes it to a transport module for delivery to the second node. The object handler maintains status indicators for the messages it sends to the second node and updates an indicator corresponding to the message just sent if the transport module reports that the message was successfully received by the second node.

If, however, the transport module cannot report a definite status (e.g., success or failure) of the message then the originating object handler takes additional action to determine the message status. In one embodiment it issues a query or management message to the object handler on the second node, which query message includes the identifier of the original message. If the destination object handler did not receive the message (and update its status indicator(s)) before the query is received, it informs the originating object handler that the message was not received. In this case both object handlers store or otherwise make note of the identifier of the original message, which may be lost. The originating object handler then sends a new or repeat version of the message, but with a different identifier. In one embodiment of the invention message identifiers are sequence numbers large enough in magnitude so that they rarely, if ever, repeat.

Each object handler compares the identifiers of messages it receives from a node against all identifiers (if any) of lost messages associated with the sending node. If an identifier of a received message matches a lost message identifier, the received message is discarded. Thus, if the destination object handler receives the original message after being queried, the message will be discarded. In addition, before a sending node assigns a sequence number or other identifier to an outgoing message, it first ensures that the identifier does not match any of the stored identifiers of lost messages.

In one embodiment of the invention a first node that sends communications or messages to a second node stores identifiers of its lost messages in a table (e.g., a table hashed by the corresponding identifiers). The first node may also store the identifiers of messages that could not be transmitted from the first node (e.g., because of a communication link failure or other hardware failure).

In this embodiment of the invention the second node employs multiple cooperating data structures to track and verify the status of the communications generated for the second node from the first node. In particular, more recent communications are reflected in a vector containing multiple entries, one entry per communication. Each vector entry includes two indicators, one to reflect whether the corresponding communication was received at the second node and another to reflect whether the first node rescinded the communication. In this embodiment a communication is considered rescinded if the second node receives a query message about an earlier communication and the earlier communication has not been received by the time the query message is received.

The second node tracks the status of older communications in another structure, such as a table. Each entry in the table corresponds to one communication addressed to the second node from the first node but which has not been received at the second node. As more and more communications are sent from the first node to the second node, older entries in the vector are removed and, for removed entries corresponding to non-received communications, entries are made in the table. In this embodiment of the invention the vector is extended or expanded when necessary by allocating additional memory space on the second node. Periodically, the first node may send to the second node the identifiers of the communications that it could not transmit, so that the second node may remove the corresponding entries in its table.

DETAILED DESCRIPTION

Figure 1A:
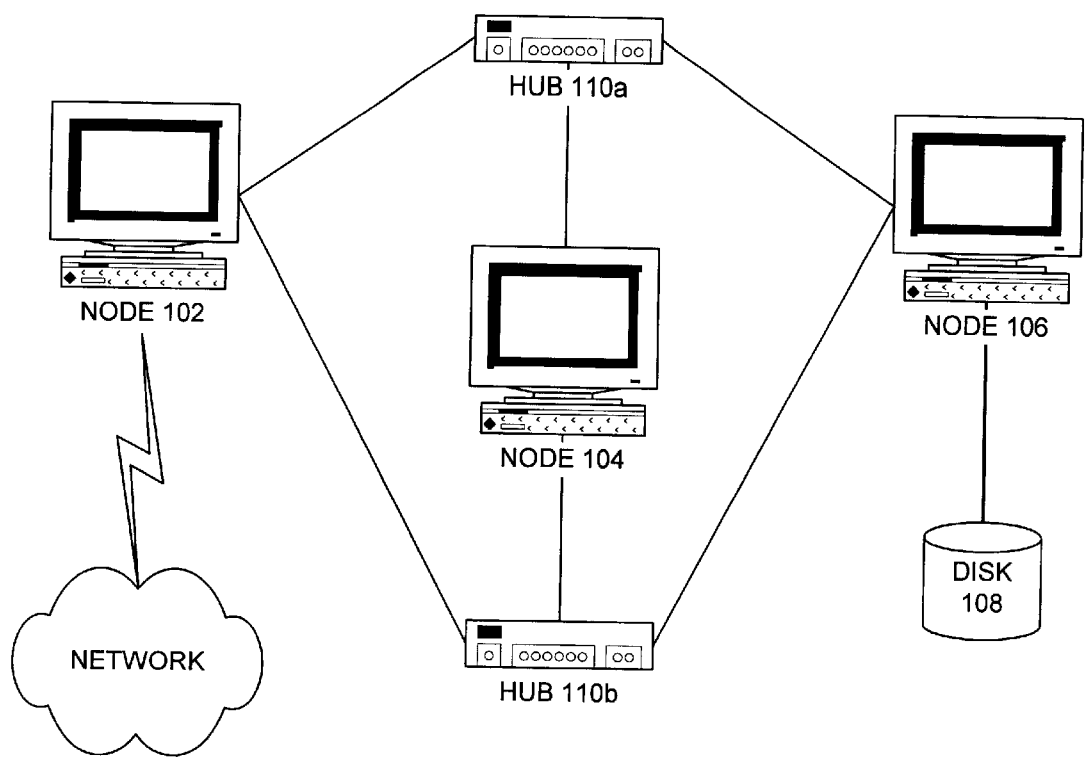
FIG. 1A is a block diagram depicting a specialized computing environment in which multiple nodes share access to a resource in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage and display) are well known and are omitted for the sake of clarity. In particular, a present embodiment of the invention is intended for use in a clustered computing environment.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In a multi-node computing environment described below, a method is provided for ensuring delivery of a message (e.g., data, an object request or invocation) from one node to another. Illustratively, the method operates in an object-oriented programming environment in which one node desires or requires access to an object on another node. Messages for such purposes are initiated by object handler modules (e.g., in response to requests from higher-level services) on each node and are assigned unique identifiers so that the status of the messages may be tracked. Transport modules within each node process outgoing messages to ensure they are formatted and structured as necessary for transmission over a communication link. The transport modules also receive incoming messages and pass them to the object handlers.

When the status of a message is in doubt (e.g., the transport module has not received an acknowledgement of a message), the object handler that sent the message queries the destination object handler and refers to the identifier of the message. If the destination object handler did not receive the message, both object handlers store the message identifier so that it will not be reused and the originating object handler resends the message with a new identifier. If the destination object handler later receives a message having the stored identifier, the message is discarded.

Further details and descriptions of systems and methods of the present invention are provided in the following sections.

A System for Ensuring Delivery of Communications

FIG. 1A depicts an illustrative system for implementing a method of the present invention. FIG. 1A describes a computing environment, such as a cluster, in which member nodes are located in relative proximity to each other. As one of ordinary skill in the art will appreciate, however, the methods of the invention described below are not limited to the environment depicted in FIG. 1A. In particular, a method of the invention may be employed in computing environments in which participating computing devices are separated anywhere within a large range of dispersal patterns (e.g., direct connections, local area networks, wide area networks).

The cluster environment of FIG. 1A comprises three computing devices, nodes 102–106. In this embodiment the computing devices may be desktop, workstation or other robust computer systems. In other embodiments a computing environment may comprise virtually any type of computing devices, including hand-held computers, smart phones, etc.

Nodes 102–106 are interconnected via hub 110a and hub 110b. Illustratively, each hub is connected to each node participating in the cluster. Thus, in the illustrated environment multiple communication paths may exist between two communicating nodes. In another suitable environment, however, two nodes may be connected by only one communication path and in yet another embodiment a participating node may only be connected to one hub.

In the illustrated embodiment of the invention, one purpose of inter-connecting nodes 102–106 with hubs 110a, 110b is to allow a participating node to access a resource that is not directly connected to the node. Thus, node 106 is directly connected to disk 108 and node 102 is connected to a network, such as the Internet. In this system, node 104 may access disk 108 or the network even though it has no direct connection to either resource. In particular, node 104 may submit access requests to the node that controls the resource, which node will then execute the request on behalf of node 104. In one embodiment of the invention, more than one node in a cluster may be directly connected to a shared resource, in which case one node may take over control or management of the resource if the first one fails or is taken off-line. In other embodiments of the invention communications between nodes are conducted for virtually any reason and are not limited to resource access.

It can be seen in FIG. 1A that when a node requires access to a resource it is vital that the request be received at the node that controls the resource. However, different nodes may control different resources at different times. Thus, disk 108 could also be connected to node 104 so that if node 106 fails or otherwise becomes unavailable, node 104 may take over control of the disk and satisfy access requests from other nodes (e.g., node 102). In addition, it is preferable that a message only be received once, so as to minimize extraneous communications and avoid servicing the same request more than once.

Figure 1B:
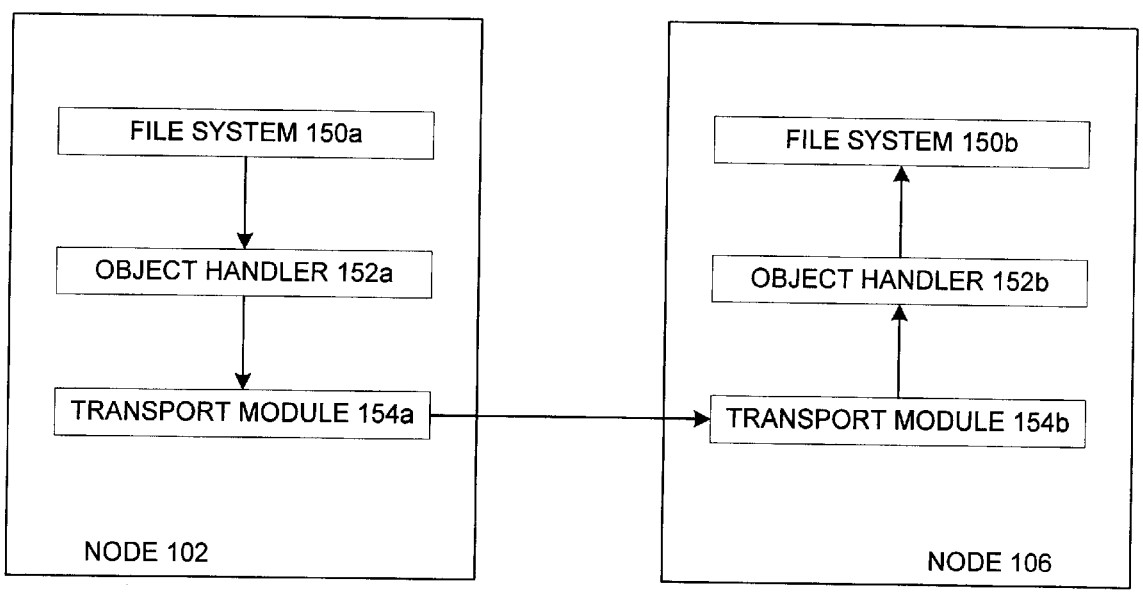
FIG. 1B is a block diagram of two nodes of the environment of FIG. 1A, demonstrating the flow of a message from one to the other in accordance with an embodiment of the present invention.

FIG. 1B is an illustrative block diagram depicting the flow of a message from node 102 to node 106 concerning an object locally available to node 106. In particular, FIG. 1B depicts a request for access to disk 108 from node 102 to node 106. In FIG. 1B, file system 150a of node 102 invokes, references or initiates a request for an object on disk 108 (e.g., a request to update or retrieve a file) to object handler 152a. Object handler 152a constructs a message to request the necessary action and passes it to transport module 154a. Transport module 154a transmits the request to transport module 154b of node 106. The request is then passed to object handler 152b and file system 150b.

In one particular embodiment of the invention the computing environment of FIG. 1A is a highly available cluster system such as that provided by Sun Microsystems, Inc. In this embodiment object handlers 152a, 152b are ORBs (Object Request Brokers) such as described in the CORBA (Common Object Request Brokering Architecture) standard. Thus, the messages that are passed between nodes in a present embodiment of the invention may be ORB messages (e.g., object references or invocations). Further, transport modules 154a, 154b are custom mechanisms for transporting a message from one node to another within the cluster. Because control of a cluster resource may change during operation of the cluster (e.g., because of node failures or re-initializations), communications between nodes must be reliable. Methods of the invention described below operate to ensure message delivery from one node to another and, further, help ensure that only one copy of the message is delivered (e.g., so that a node may avoid repeating actions taken in response to a message).

Transport modules 154a, 154b are responsible for sending and receiving messages constructed by their respective object handlers. Thus, transport module 154a on node 102 is responsible for formatting the access message from object handler 152a (e.g., into multiple packets or another form used for inter-node communications) and transmitting it over a communication link toward node 106 (e.g., to hub 110*a* or hub 110*b*). Transport modules 154*a,* 154*b* may comprise one or more modules operating at a relatively low (e.g., data or physical) level.

A node may incorporate multiple transport modules, particularly if multiple paths exist between the node and the intended destination node. Thus, node 102 may incorporate one transport module for communications sent or received through hub 110*a* and another transport module for communications sent or received through hub 110*b*. The use of a particular transport module may be transparent to an object handler.

One function of transport module 154*a* is to report to object handler 152*a* the status of a message that it is directed to send to node 106. Illustratively, however, transport module 154*a* recognized three statuses. If it receives an acknowledgement of the message from transport module 154*b,* then it reports a success. If it is unable to transmit the message (e.g., the communication link fails), then it reports a failure. Otherwise (e.g., it transmits the message but does not receive an acknowledgement), it can only report that the message status is uncertain.

For example, a communication anomaly or interruption of a link may have caused the message acknowledgement to be lost as it was being returned. Or, a link from hub 110*a* to node 106 may fail after the transport module transmits the message to hub 110*a,* in which case the message is not received by node 106. In either case, transport module 154*a* cannot ascertain the true status of the message. Therefore, object handler 152*a* must take action to ensure that the message was or is delivered.

FIG. 1B thus illustrates one manner in which a high-level service (e.g., a file system) on one node may initiate a request to another node, which request is converted into an object message and released to a transport module for transmission to the other node. Different types of high-level services operating on a node may cause an object handler to generate different types of messages. Other than a file system, other high-level services may include naming services and network services. For example, network services on multiple nodes in a cluster may cooperate to share one IP (Internet Protocol) address or other network resource. Thus, file system 150 is but one example of a high-level service that may be configured on multiple nodes of a computing environment. An implementation of a method of the invention for sharing virtually any type of resource or service in a multi-nodal computing environment may easily be derived from one of the methods described below. The term "message" is not limited to ORB object messages and is used herein to refer to virtually any type of communication from one node to another.

The following section describes various methods of ensuring the delivery of a message (e.g., data, an object or method invocation) from one node to another in a multi-node computing environment. The scope of the invention is not limited to any of the methods that are described, which may be modified to suit virtually any particular environment, as will be apparent to one of ordinary skill in the art.

One Method of Ensuring Delivery of a Communication From One Computer Node to Another In association with the clustered computing environment of FIG. 1A, a method of the invention may be implemented to allow object handler 152*a* to determine whether a message sent to node 106 was received by object handler 152*b*. In this method, an object handler tracks the status of messages exchanged with other nodes and may query another node to determine if a message was successfully received. In particular, when a transport module reports the status of a message as being unknown or uncertain (i.e., not a success and not a failure), then the originating object handler must determine the message status. In one embodiment of the invention unique identifiers (e.g., sequence or serial numbers) are assigned to messages as the messages are generated or constructed by an object handler.

In this method the object handler on the originating node sends a management message or query (which, illustratively, does not have a sequence number) to the destination node identifying the sequence number of a message that has not been accounted for. The destination node acknowledges receipt of the message if it received it. If, however, the message was not received, the destination node informs the origination node and both of them store the sequence number of the "lost" message. In this embodiment the sequence number of the lost message is never again used. And, if the destination node receives a message having this sequence number, the message is discarded. This may happen, for example, if the original message was delayed from reaching the destination object handler in a timely fashion and did not arrive until after the management message was sent. In this embodiment of the invention, if either node is reinitialized they may both restart the message sequence numbers and clear any sequence numbers of lost messages that they may have stored.

In a present embodiment of the invention, message sequence numbers are virtually unique because they are relatively large in magnitude (e.g., 32 bits). Illustratively, the first sequence number assigned to an outgoing message after a node is initialized may be the number zero, after which each successive outgoing message may be given a sequence number one greater than the last. The current or next sequence number to be assigned to a message may be stored in a counter, a register, etc.

Each node (e.g., object handler) in this embodiment maintains a multi-bit mask with which to track the delivery status of messages it has sent and received. Such a mask may, for example, indicate the delivery status of a message by the state of one or more bits within the mask. Illustratively, a status of one message (e.g., success or failure) may be indicated by a single bit of the mask. In this embodiment each node maintains a separate mask for each node to which it sends messages and a separate mask for each node from which it receives messages. For a pair of communicating nodes, the sender's mask for messages sent to the receiver should match or be very similar to the receiver's mask for messages received from the sender.

The size of a mask determines the number of recent messages that may be tracked. Thus, where an object handler's mask is 1,024 bits long and a message status may be indicated with just one bit, the object handler may track the status of the last 1,024 messages. Illustratively, when a message is sent, the corresponding bit is cleared (e.g., a zero is stored). Then, when the object handler is informed (e.g., by a transport module) that the message was successful (e.g., an acknowledgement was received from the destination node), the bit is set (e.g., a one is stored). Similarly, when an object handler receives a message, it stores a one in the corresponding bit position for the appropriate mask.

A message mask therefore operates as a sort of circular queue to reflect the status of the last messages sent or received by a node. One or more pointers or references to mask positions may be maintained to identify which bit is to be associated with the next or current message and/or which is the oldest, valid bit in the mask.

Because the mask is used in a circular fashion in this embodiment, the sequence number associated with a base (e.g., oldest) bit in the mask may be stored. From this sequence number the sequence number of a selected position in the mask may be determined by adding to the base sequence number the number of positions between the base bit and the selected bit. Similarly, when a new message is received, the mask position to be set to one may be determined by finding the difference between the new message's sequence number and the sequence number of a reference position in the mask.

In the presently described embodiment of the invention each object handler stores (e.g., in a hash table or list) the sequence numbers of messages determined to have been lost. Thus, when a message sent to a destination object handler from an origination object handler is considered lost, both object handlers will store the sequence number. Illustratively, the collection of lost sequence numbers is cleared only when one of the nodes is reinitialized or rebuilt.

Figure 2A:
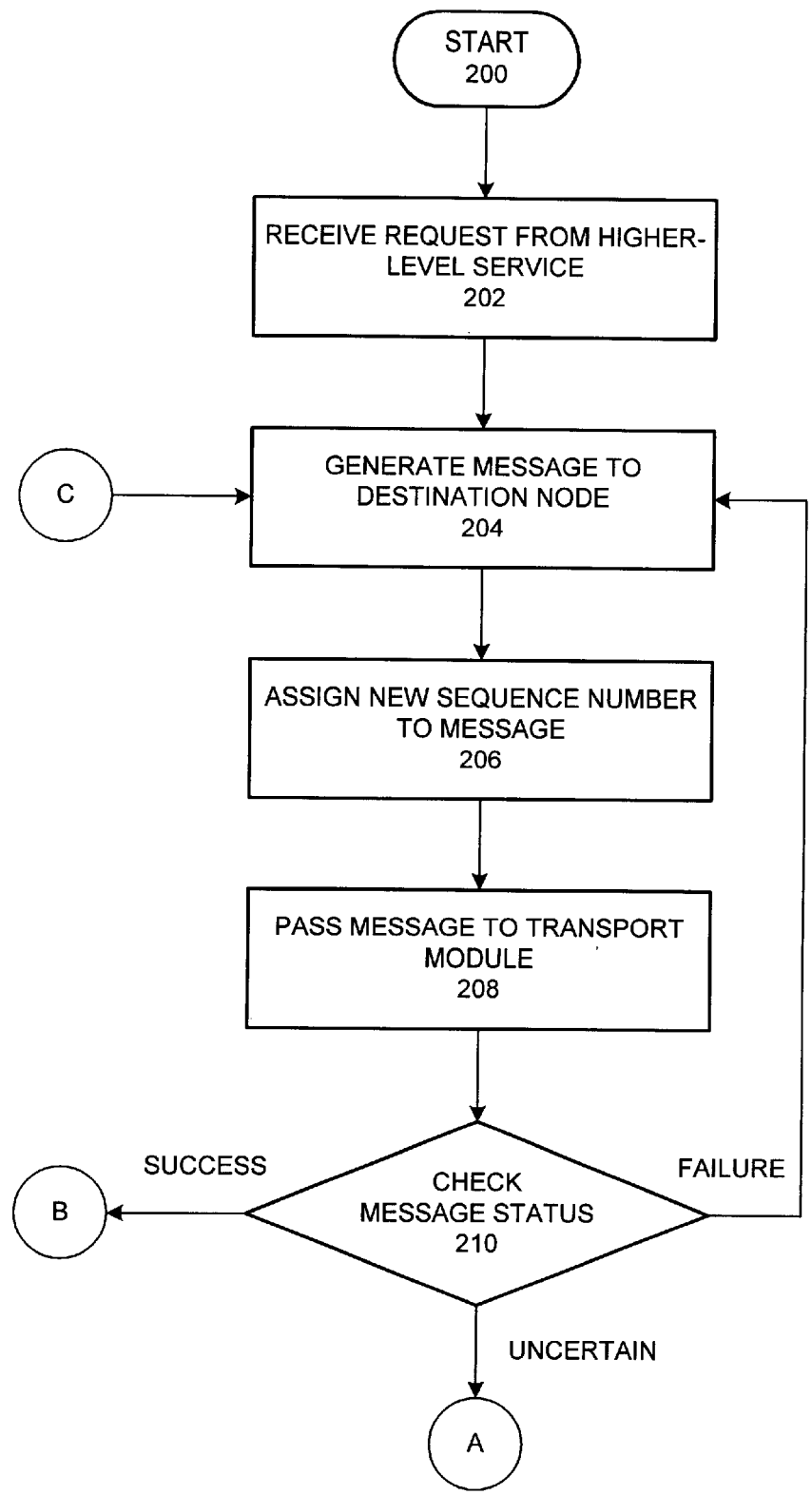
FIGS. 2A–2B are flowcharts illustrating one method by which an origination computer node may ensure delivery of a message to a destination computer node in accordance with an embodiment of the invention.
Figure 2B:
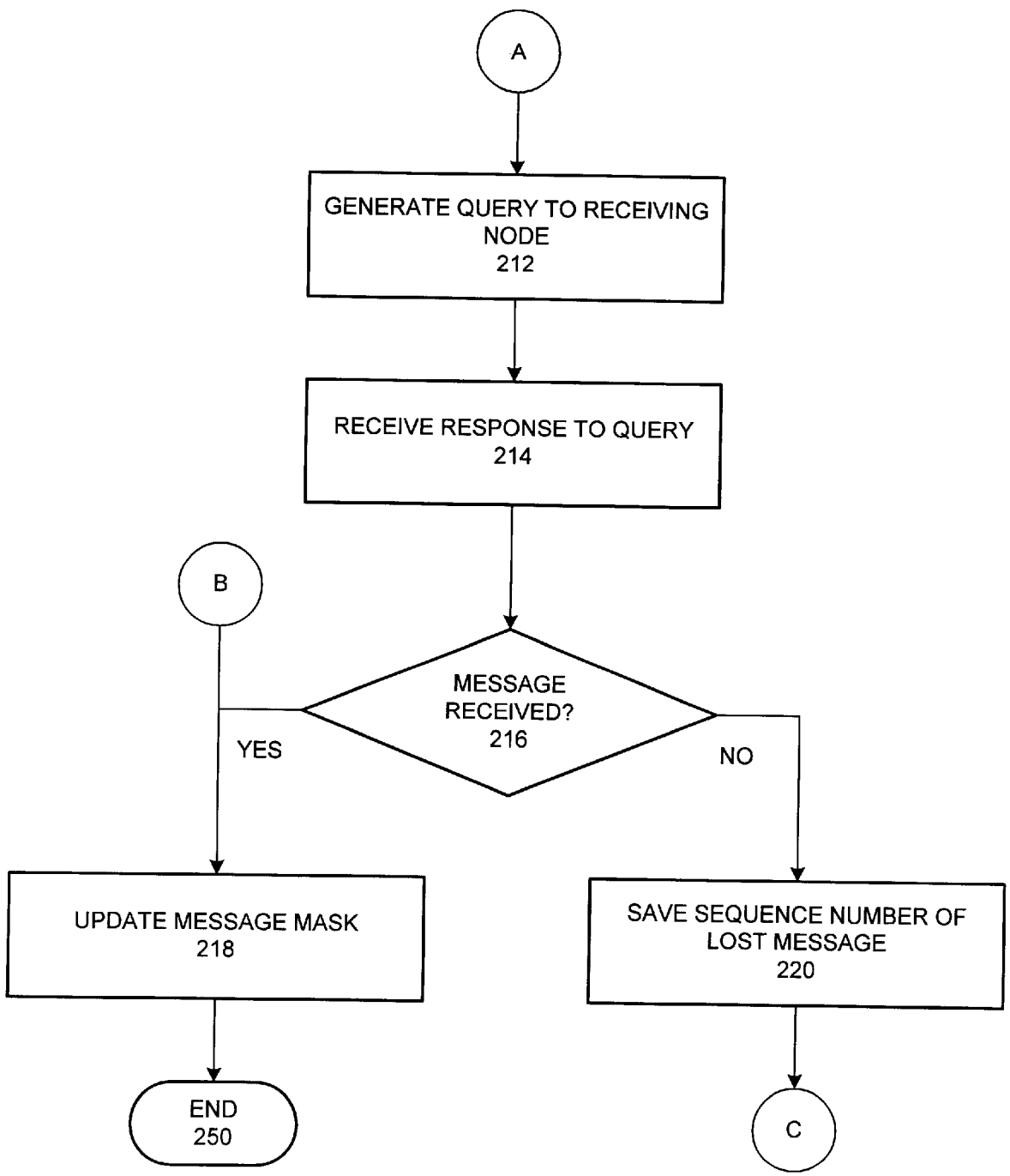
Figure 3A:
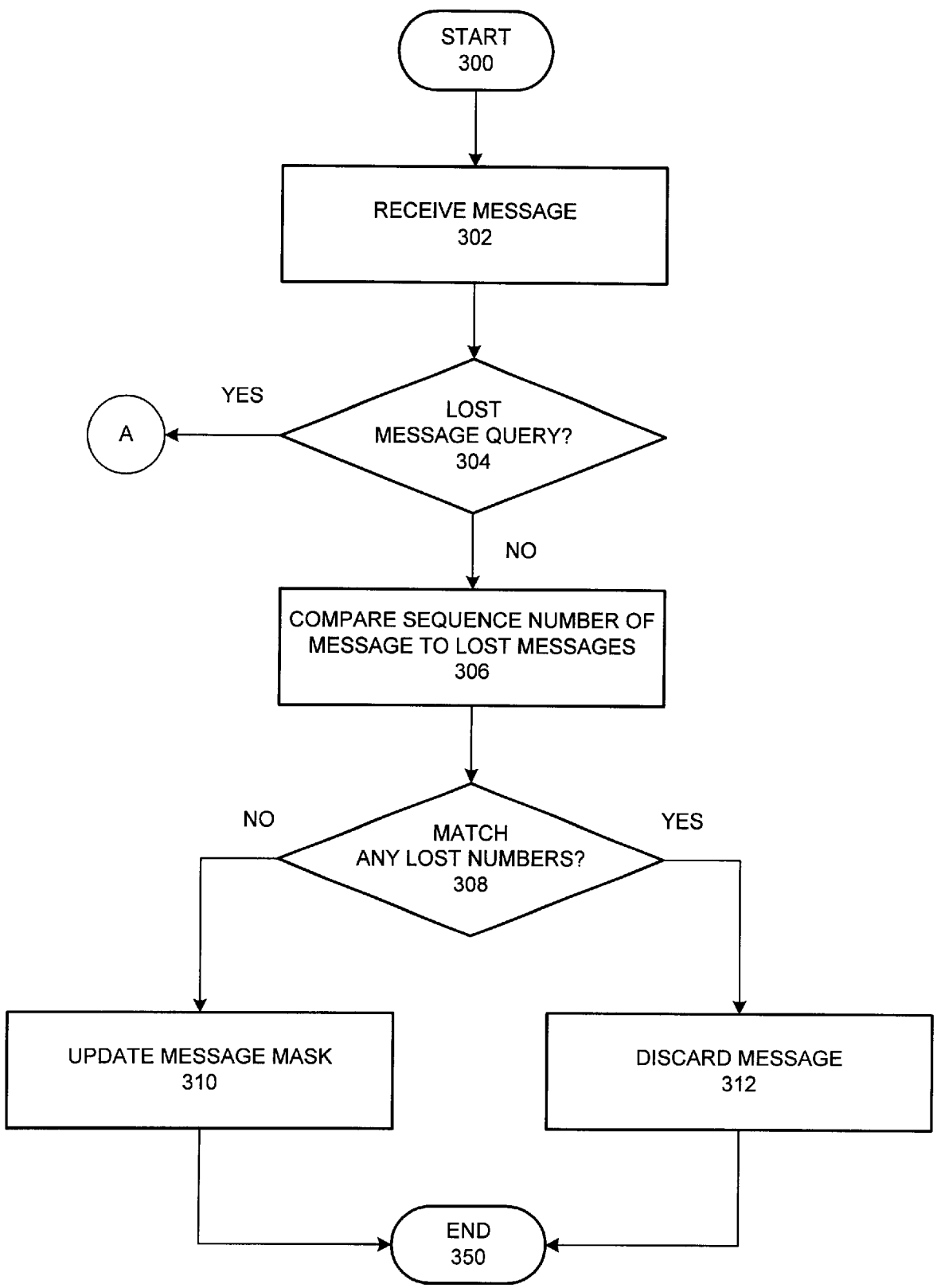
FIGS. 3A–3B are flowcharts illustrating one method of operating a destination node in accordance with an embodiment of the invention described in conjunction with FIGS. 2A–2B.
Figure 3B:
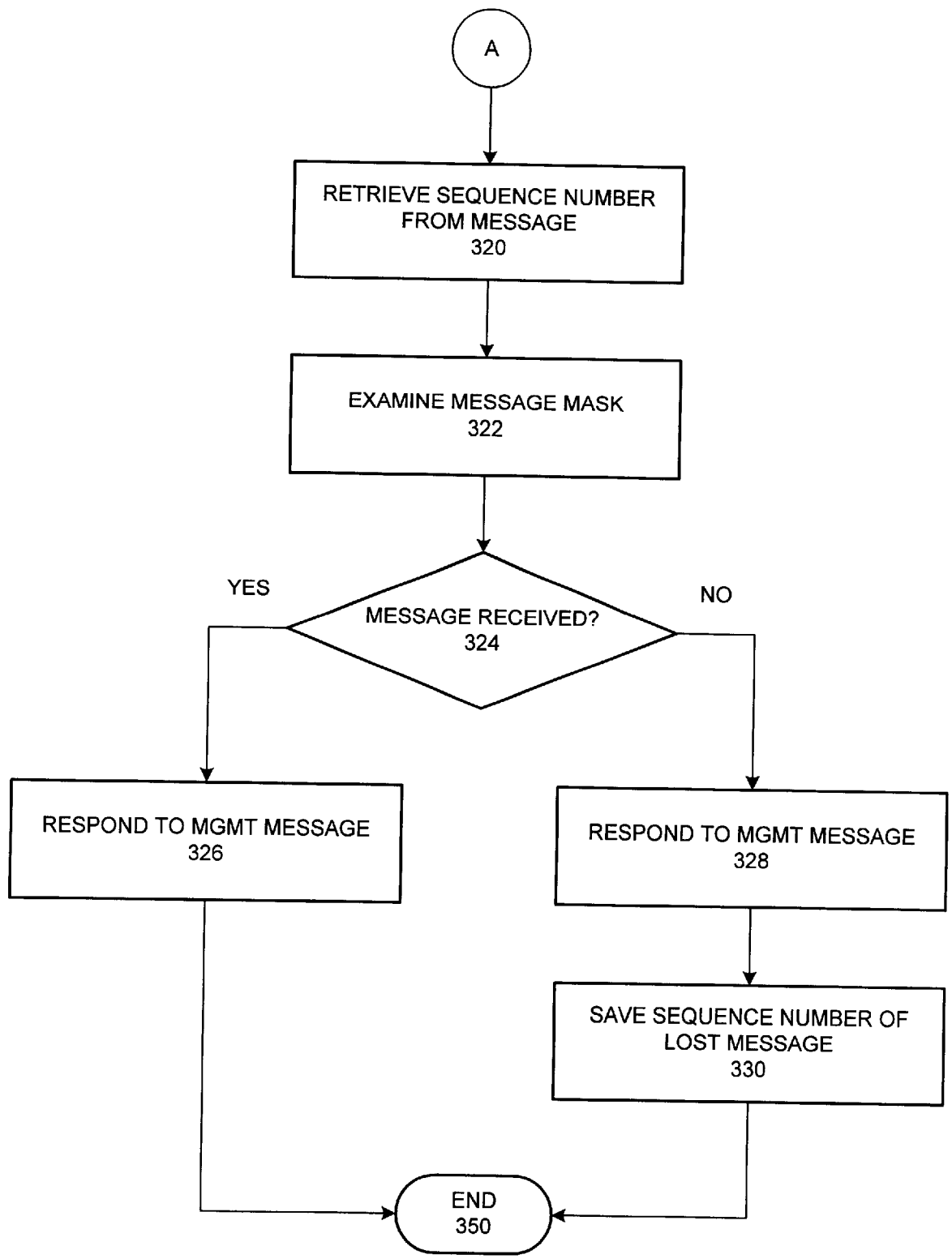

FIGS. 2A–2B depict one method by which an originating object handler ensures delivery of a message to a destination object handler in accordance with one embodiment of the invention. FIGS. 3A–3B depict a method by which the destination object handler cooperates with the originating object handler. In FIGS. 2A–2B, state 200 is a start state.

In state 202, an object handler on a first node in a multi-node computing environment receives a request (e.g., a request for, invocation of, or reference to an object) from a higher-level service for an object on another node. The higher-level service may be a file system, a naming service, a network service or some other service or application operating on the node. For example, a naming service operating on the node may invoke a method of an object on the other node in order to register or name an object. As another example, the higher-level service may be a file system such as PXFS (Proxy File System), which is used in the Sun™ Cluster environment provided by Sun Microsystems, Inc. In such an environment the destination, or target, node controls access to a resource (e.g., a storage device) needed to satisfy the high level request. Illustratively, the object may also be represented locally, on the originating node (e.g., as a stub object), but the implementation of the method may only be available on the other node.

In state 204 an object handler on the originating node generates or formats a message directed to an object handler on the destination node. In an embodiment of the invention in which an object handler is an ORB (Object Request Broker) configured in accordance with the CORBA standard, the message will also adhere to that standard.

In state 206 the object handler assigns a unique sequence number to the message and includes it in the message. As described above, the sequence number may be large in magnitude, thus greatly reducing the frequency with which a sequence number is reused. When a node is reinitialized, though, sequence numbering may begin again at an initial value (e.g., zero or one).

A new sequence number may be determined by referring to a data structure (e.g., a register) in which the sequence number is tracked. As part of the process of assigning a sequence number, however, the object handler considers any sequence numbers associated with "lost" messages to be unavailable for use. In particular, whenever an object handler determines, by consulting a destination object handler, that a message was successfully transmitted by the origination node but not received by the destination object handler, the sequence number of the message is marked and is not used again (e.g., until one of the nodes is reinitialized or restarted).

In state 208 the object handler passes the message to a transport module of the origination node. The node may incorporate more than one transport module, particularly if multiple communication links are coupled to the node. Thus, some method of determining a preferred transport module may be applied. The object handler may determine which communication path to the destination node is fastest, cheapest or shortest, or use some other criteria (e.g., random selection).

In state 210 the originating object handler receives a delivery status of the message from the transport module that was charged with transmitting the message. As one option, the status may indicate that message transmission failed because the transport module could not transmit the message (e.g., the link failed before transmission), in which case the illustrated method returns to state 204 and tries to send the message again. The repeat version of the message may be derived from the original message or may be generated anew. In the presently described embodiment of the invention the repeat message receives a new sequence number that is different from the sequence number of the original message. In one alternative embodiment, however, a repeat message may be assigned the same sequence number.

As another possibility in state 210, the transport module may report that the message was successfully delivered (e.g., it received an acknowledgement from the destination node), in which case the illustrated procedure advances to state 218. Otherwise, if the transport module cannot report a clear failure or a clear success, the object handler deems the delivery status of the message to be uncertain and proceeds to state 212.

In one alternative embodiment of the invention the object handler may only receive notification from a transport module of clear failures and clear successes. To identify uncertain messages the object handler must refer to a message mask or other data structure that may be used to track the delivery status of transmitted messages. Illustratively, the mask is of a predetermined size (e.g., 1K) and thus reflects the status of a number of messages proportional to the size of the mask (e.g., 1024 messages). Each bit of the mask is given a first value (e.g., zero) when the associated sequence number is assigned to an outgoing message. The bit is changed (e.g., to one) if the transport module reports that the message was successfully received by the destination node. The object handler may thus examine the message mask on a regular basis to determine if any messages were not successful, thereby making their status uncertain.

In one embodiment of the invention each node of the computing environment maintains a message mask for each node to which it sends messages and a separate message mask for each node from which it receives messages.

In state 212 the originating object handler generates a query to the destination object handler concerning the uncertain message, which may be lost. Illustratively, the query message is not assigned a sequence number because it is not associated with a higher-level service and because it is not critical to ensure that only one copy of the query message is received by the destination node. The lost message query does, however, include the sequence number of the uncertain message. The query message is then given to a transport module for transmission to the destination node.

In state 214 the object handler receives a response to the query message from the destination object handler.

In state 216 the status of the original message is determined. If the message was not successfully received at the destination object handler, the method proceeds to state 220.

Otherwise, the original message was successful and in state 218 the originating object handler updates its message mask accordingly. After state 218 the illustrated method ends at end state 250.

In state 220, the sequence number of the unsuccessful message is noted in order to prevent the originating object handler from reusing it. The sequence number may, for example, be stored in a list, a hash table or other data structure. After state 220, the object handler returns to state 204 to derive, or generate, a repeat of the original message and send it with a different sequence number.

One of ordinary skill in the art will appreciate that the flow chart of FIGS. 2A–2B depicts just one method of operating an originating object handler to ensure delivery of a message. The illustrated method may be modified in various ways to operate differently without exceeding the scope of the invention.

FIGS. 3A–3B depict a cooperating method by which a destination object handler may operate to verify or ensure delivery of a message in one embodiment of the invention. State 300 is a start state.

In state 302 an object handler on the receiving node receives a message from the originating object handler. Where the receiving node is coupled to multiple communication links, multiple transport modules may be employed, in which case the message may be provided to the object handler by any one of them.

In state 304 the object handler determines the type of message. If the message is a query concerning a message that may have been lost, the illustrated method proceeds to state 320.

Otherwise, in state 306 the object handler retrieves the sequence number of the new message and compares it to the sequence numbers of messages that have been deemed to have been lost between the originating node and receiving node.

If in state 308 the new message's sequence number matches any of the lost messages, the procedure continues at state 312, where the object handler discards the message and ends at end state 350.

If the new sequence number does not match any of the stored sequence numbers, then in state 310 the receiving object handler updates its message mask to indicate successful receipt of the message. In particular, the object handler identifies the position in the message mask that corresponds to the newly received sequence number and stores a value indicating successful receipt of the message. After state 310, the illustrated method ends at end state 350.

In state 320 the destination object handler retrieves from the lost message query the sequence number of the uncertain message.

In state 322 the destination object handler examines its message mask for messages received from the originating node to find the entry corresponding to the sequence number in question. Illustratively, one or more pointers and/or other data structures may be associated with the message mask. Pointers may, for example, identify the mask entry associated with the most recently used sequence number, the next sequence number to be used, or the oldest sequence number associated with the message mask. Illustratively, a base or reference sequence number is stored, which may correspond to the oldest message tracked in the mask. Thus, by retrieving the base sequence number and calculating the difference between the base sequence number and the sequence number of the uncertain message, the object handler can determine where in the message mask (e.g., the number of positions from the base reference) the status of the uncertain message is recorded. Illustratively, the mask bit that corresponds to the uncertain message has a first value (e.g., zero) if the message was not received, and a second value (e.g., one) if it was received.

In state 324, if the message mask indicates that the message was not received, the illustrated method continues at state 328. Otherwise (i.e., the message was received) it proceeds to state 326.

In state 326 the object handler responds to the lost message query by returning a message indicating successful receipt of the uncertain message. The uncertain message may again be identified by its sequence number. In one embodiment of the invention the return message is not given a sequence number. In one alternative embodiment of the invention, instead of constructing a new message, the destination object handler instructs a transport module to send a normal acknowledgement. A transport module on the originating node will receive the acknowledgement and inform the originating object handler, which can then update its message status. After state 326 the illustrated method ends at end state 350.

In state 328 the object handler responds to the lost message query by generating and sending a message indicating that the uncertain message was never received. Illustratively, the uncertain message is again identified by its sequence number, but the response message itself may not be assigned a sequence number.

In state 330, the object handler saves the sequence number of the lost message (e.g., in a list, a hash table, etc.). The illustrated procedure then ends at end state 350.

One of ordinary skill in the art will appreciate that the flow chart of FIGS. 3A–3B depicts just one method of operating a destination object handler to ensure delivery of a message. The illustrated method may be modified in various ways to operate differently without exceeding the scope of the invention.

An Alternative System and Method For Ensuring Delivery of a Communication From One Computer Node to Another In one alternative embodiment of the present invention, an alternative method is provided for ensuring delivery of a single communication sent from one computer node to another. This alternative method is suited for use within a clustered computer environment but is also suitable for environments in which computer systems are more dispersed or less tightly coupled.

Figure 4:
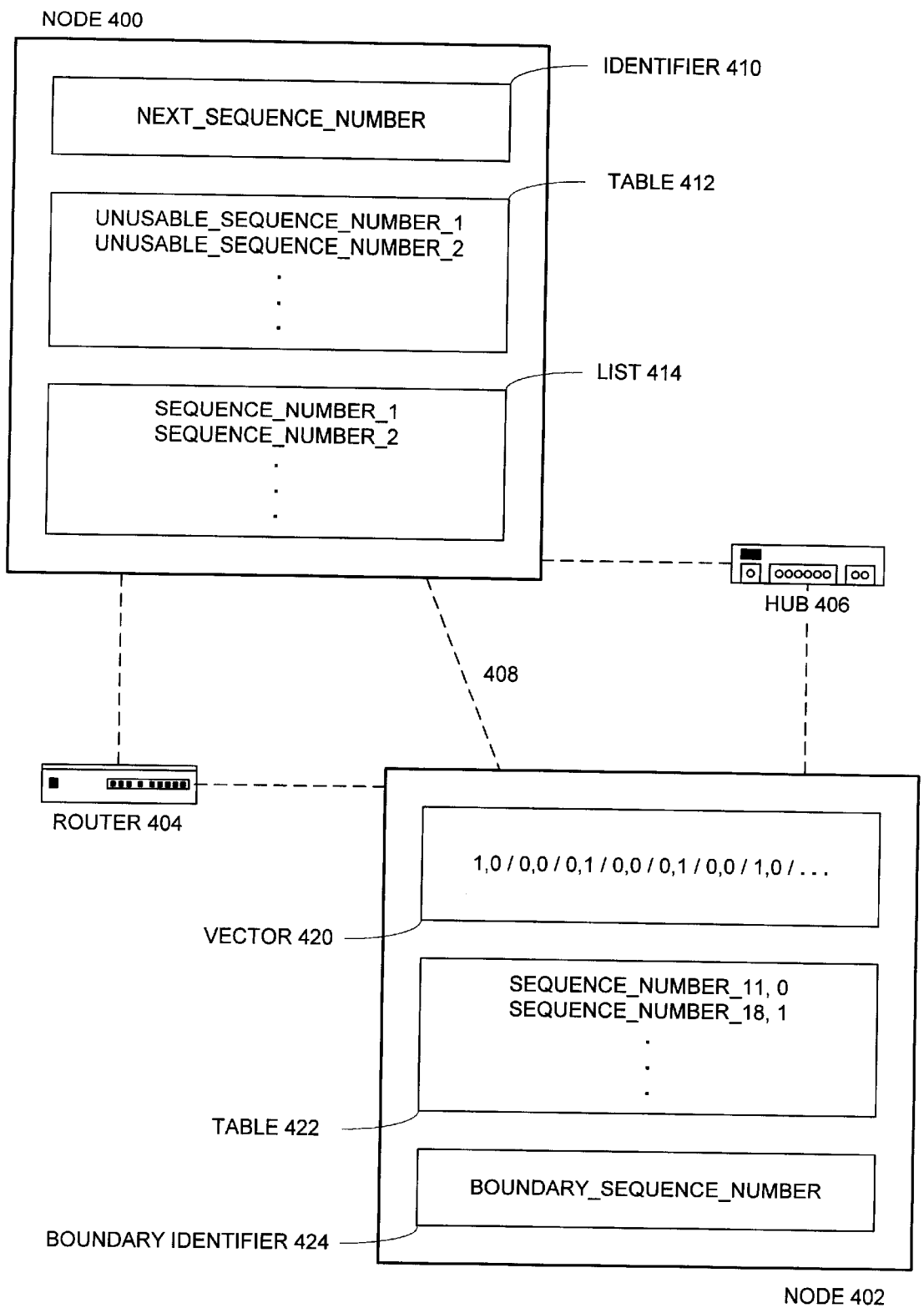
FIG. 4 is a block diagram of a multi-node computing environment according to one alternative embodiment of the invention.

Illustrative configurations of a pair of computer nodes are shown in FIG. 4. In particular, FIG. 4 depicts exemplary data structures that may be employed to ensure delivery of individual communications dispatched from a sending node to a receiving node. Illustratively, the depicted data structures are replicated for each pair of sending and receiving nodes in a computing environment.

In FIG. 4, node 400 sends one or more communications (e.g., packets, frames, object messages as described in a previous section) to node 402. One or more communication paths may exist between the two nodes, as represented by optional router 404, hub 406 and direct connection 408.

On sending node 400, three particular data structures are employed by an object handler (e.g., an object request broker) that is responsible for dispatching and ensuring delivery of individual communications to a similar object handler on a target node. Identifier 410 is a register or other data structure in which the object handler maintains a value used to uniquely identify a present or next communication to be sent by the object handler on node 400 to another node. Illustratively, the value is in the form of a sequence number that is incremented for each successive outgoing communication. In this implementation identifier 410 stores the sequence number to be assigned to the next communication. When a new communication is to be sent the current value of identifier 410 is retrieved, assigned to the new communication and then incremented and stored back in identifier 410.

Table 412 is a table or other suitable data structure (e.g., list, array) in which unusable identifiers (e.g., sequence numbers) are stored. Illustratively, an identifier becomes unusable after it is assigned to a communication that is or may have been lost in transit between node 400 and a target node. In particular, and as described in a previous section, an object handler that sends a message or communication to another node may be informed that the status of a dispatched message may be success (e.g., an acknowledgement was received from the other node), failure (e.g., a transport module could not transmit the message) or uncertainty (e.g., the message was transmitted but no acknowledgement was received). For messages having an uncertain status, the sender may query the target recipient to determine if the message was received. If the target reports that the message was not received, both nodes (e.g., their object handlers) record or make note of the sequence number. The sending node stores the sequence number in table 412 in order to avoid re-using it and the target node remembers the sequence number so that it will discard the message if it later arrives. It may be discarded because the sender will send a new version of the message or communication and it is desired that only one version of the message (i.e., the most recent) be received and used by the target node.

List 414 is a list or other data structure (e.g., table, array) of identifiers (e.g., sequence numbers) of communications sent from node 400 that could not be transmitted by the node's transport module. As just described, a transport module to which the object handler gives a communication for transmission over a communication link may be unable to transmit the communication (e.g., because of a link or connection failure). In the presently described implementation of the invention the object handler will re-send the communication with a new sequence number. The old sequence number is stored in list 414. During periodic memory management operations (described below) the contents of list 414 are provided to receiving node 402 so that it may clean up or re-arrange its memory usage.

Receiving node 402 maintains its own set of data structures to manage the receipt of communications from sending node 400. Vector 420 is an extendable bit mask, vector or similar data structure in which the status of communications received from node 400 are reflected. Vector 420 contains multiple entries, each entry associated with one identifier (e.g., sequence number) of a communication received from node 400. Illustratively, each entry includes two positions, bits or indicators. A first indicator corresponds to whether a communication having the associated sequence number was received by node 402 (e.g., an object handler operating on node 402). In this implementation the first indicator is set (e.g., has a value of one or true) if the communication has been received, and is clear (e.g., has a value of zero or false) otherwise. The second indicator corresponds to whether the communication having the associated sequence number was repudiated or rescinded by sending node 400. The second indicator is set if the communication was rescinded and is clear otherwise.

A communication from node 400 is considered rescinded by node 402 (e.g., its object handler) if it has not received the communication before it receives an inquiry from node 400 asking whether the communication has been received. Thus, if a message querying the status of a communication from node 400 is received before the communication itself is received, the second indicator for the associated sequence number is set in vector 420. If, on the other hand, the communication is received before node 402 is queried as to the status of the communication, the first indicator is set.

Illustratively, only one or the other of the first and second indicator should ever be set. That is, if the first indicator is set and then node 402 is queried as to the status of the corresponding communication, node 402 responds that the communication was received and does not set the second indicator. Conversely, if the second indicator is set and the corresponding communication is later received, the communication is discarded but the first indicator is not set.

Vector 420 is extendible in that as communications are received (and/or their statuses are queried), additional memory space is allocated to vector 420 in order to represent the communications. Thus, vector 420 may be composed of multiple memory areas that are logically, but not necessarily physically, contiguous. Various methods concerning when and how to extend the vector may be employed in different embodiments of the invention, as will be apparent to one of ordinary skill in the art. In one implementation, vector 420 may be extended whenever there are less than a minimum number of unused entries remaining in the newest vector segment. Vector 420 may also be automatically extended whenever a communication having an identifier (e.g., sequence number) beyond the highest entry is received or the status of such a communication is queried.

The growth or size of vector 420 is restrained, however, by moving old entries into table 422, a second data structure of node 402. Table 422 is a table or other suitable data structure (e.g., list, array) for storing the identifiers of communications that have not been received at node 402 from node 400. Illustratively, table 422 is a table hashed or indexed by the identifiers of such communications. In this implementation each entry includes an identifier (e.g., sequence number) and an indicator indicating whether node 400 has rescinded the corresponding communication.

In the presently described embodiment of the invention, vector 420 continually grows at a front or current end (i.e., where new segments are added and new communications are tracked). At the other (rear or old) end of vector 420 entries are removed. Illustratively, entries in which the first indicators are set are discarded, because they represent communications that have been received and their omission from table 422 will be interpreted accordingly. Further, the status of their second indicators is not required in order to respond to a query from node 400.

Thus, entries are made in table 422 for those vector entries in which the first indicators are clear, thus indicating that the corresponding messages have not been received at node 402 (e.g., an object handler on node 402). When such an entry is removed from vector 420, the associated identifier or sequence number is stored in the table along with the status of the vector entry's second indicator. The indicator for the table entry may thus simply be copied from the vector entry and retain the same value to indicate whether the corresponding communication was rescinded (e.g., a value of one or true) or not rescinded (e.g., a value of zero or false) by the time the vector entry was moved into table 422.

In a present implementation of this embodiment of the invention entries are "moved" from vector 420 into table 422 (or discarded, depending upon their first indicators) when the density of a portion at the bottom or rear end of vector 420 reaches a threshold. Illustratively, the density of a portion of the vector may be measured by comparing the ratio of the number of entries in the portion having one indicator set to the total number of entries in the selected portion. If the ratio is above a predetermined threshold, the entries in the selected portion are discarded or moved into the table, as described above.

In one embodiment of the invention memory may be allocated in chunks of 256 bytes each (i.e., 2048 bits). If vector 420 is composed of multiple segments, each one being 256 bytes long, each segment therefore contains 1,024 entries. As for table 422 in this embodiment, if each communication identifier is 32 bits long and a rescind indicator is one bit, then each table entry is 33 bits in size. A 256-byte table segment can thus contain 62 entries. In this embodiment it would thus be beneficial to move vector entries to the table when the entries in one vector segment can fit into one table segment. This occurs when there are at most 62 entries in a segment of vector 420 that must be entered into table 422 (i.e., only 62 of the 1,024 communications corresponding to the vector segment entries have not been received). The density of such a vector would be equivalent to (1,024−62)/1,024, or 94%. In this case only the receive indicators of vector entries are considered in measuring the density.

Receiving node 402 also includes boundary identifier 424, which is a register or other data structure suitable for storing an identifier (e.g., a sequence number) associated with the rear boundary (oldest entry) of vector 420 or the top (most recent entry) of table 422. In the illustrated embodiment of the invention the boundary identifier stores the sequence number of the oldest entry in vector 420. When a communication or query concerning a communication is received at node 402, the object handler may compare the identifier of the subject communication against the boundary identifier to determine in which data structure (i.e., vector 420 or table 422) the communication should be represented.

Periodically (e.g., every several seconds or predetermined number of communications), list 414 of identifiers of un-transmitted communications is packed into a communication and sent from node 400 to node 402. For each identifier (e.g., sequence number) in the list, node 402 takes appropriate action as follows. If a corresponding entry exists in table 422, the entry is discarded (e.g., the un-transmitted communication is treated as if it were received). If the corresponding entry is in vector 420, the first (e.g., receive) indicator is set. If the corresponding entry is beyond the current range of vector 420, the vector is extended, the first indicator of the corresponding entry is set, and the indicators in all the other new entries are cleared. Node 400 may then remove the entries from list 414. Illustratively, the communication used to send the list to node 402 is assigned an identifier in order to ensure that the communication is received.

In one embodiment of the invention table 412, list 414, vector 420, table 422 and boundary identifier 424 are cleared or reset when node 400 reboots or is reinitialized. In addition, the series of sequence numbers assigned to communications may be reset, thereby placing an initial (e.g., zero or one) in identifier 410.

Figure 5A:
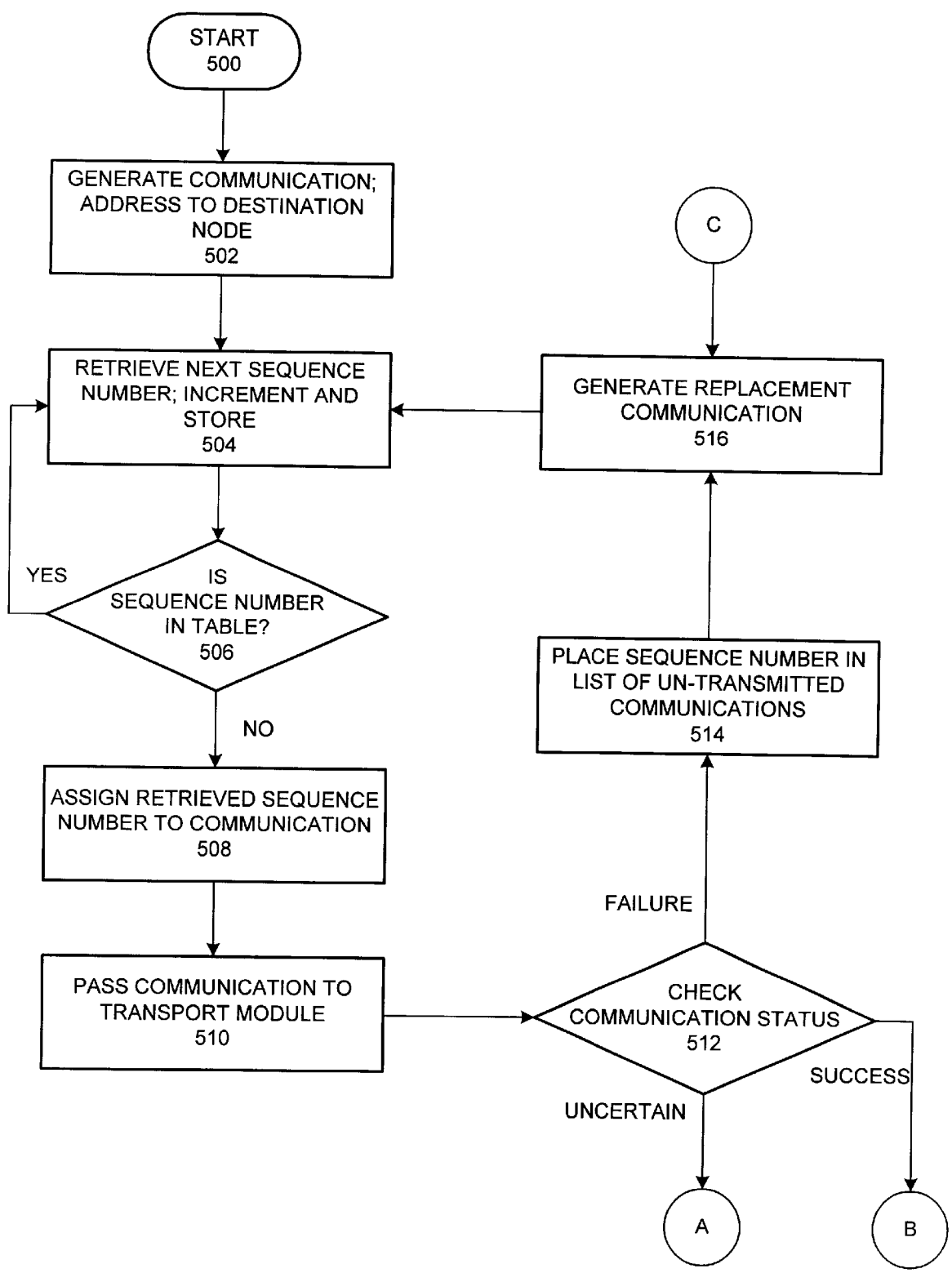
FIGS. 5A–5B are flowcharts demonstrating one method of operating a first computer node to ensure delivery of a communication to a second node according to the alternative embodiment of the invention depicted in FIG. 4.
Figure 5B:
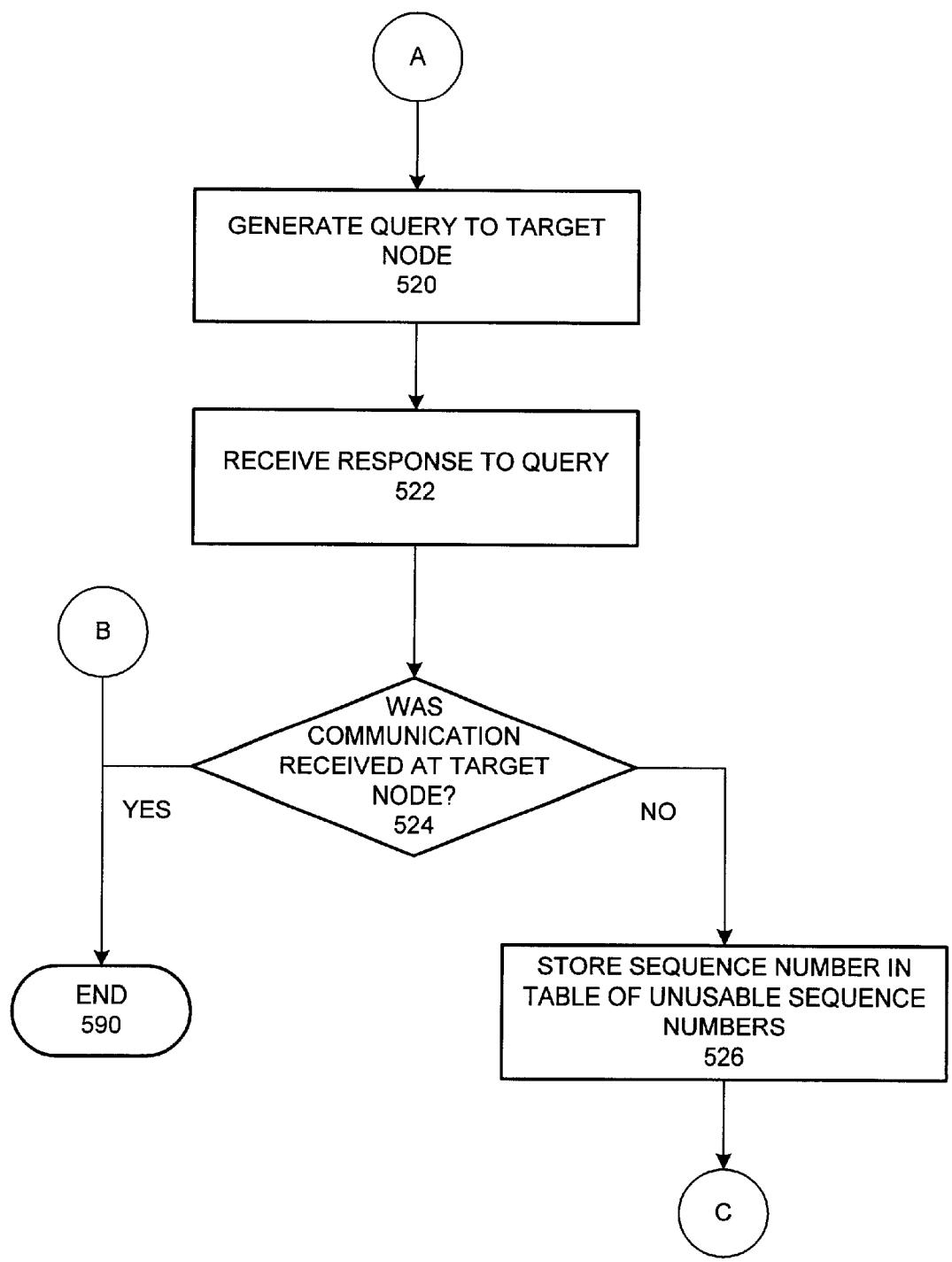
Figure 6A:
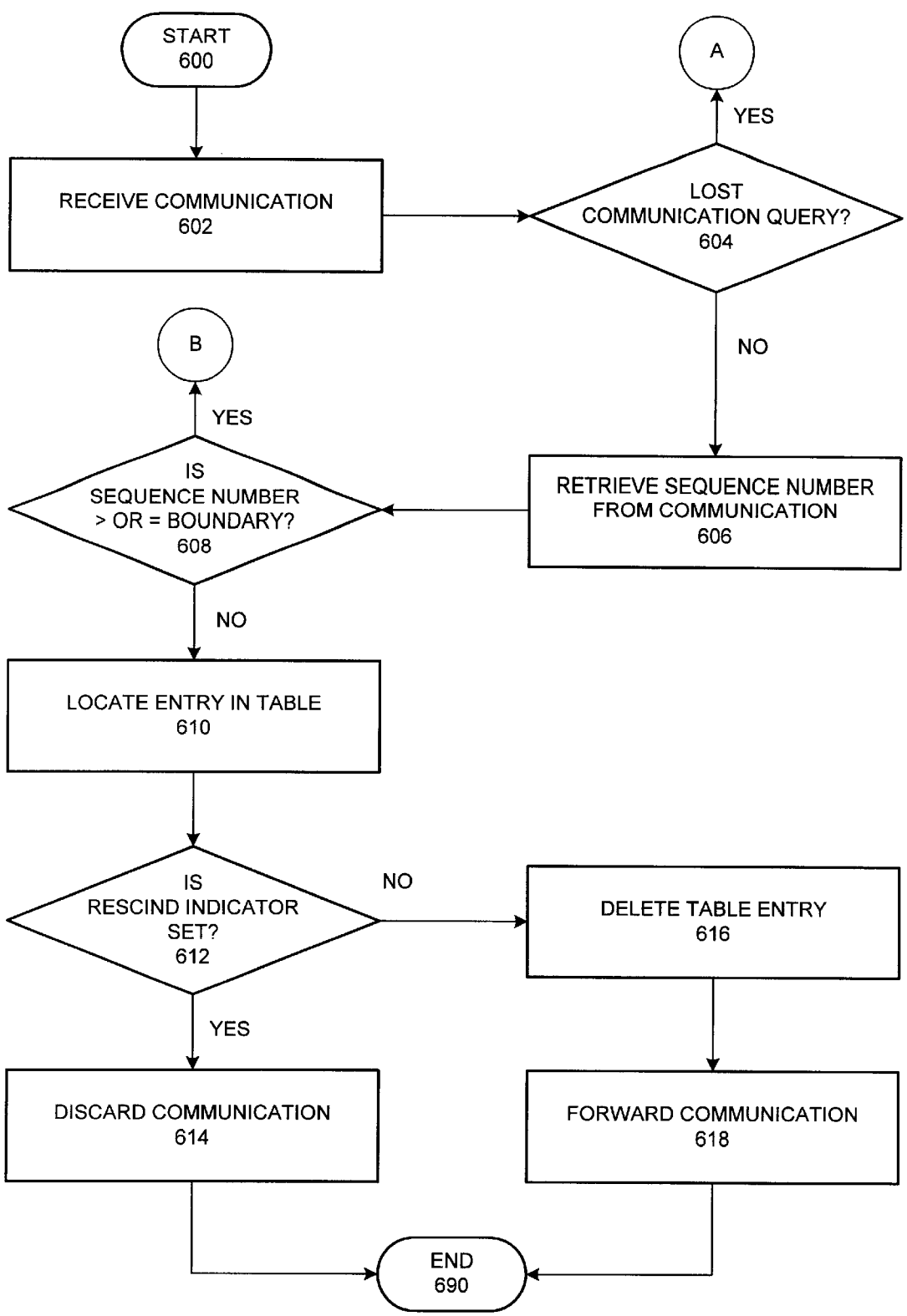
FIGS. 6A–6D are flowcharts demonstrating one method of operating a second node to receive and/or verify delivery of a communication from a first node according to the alternative embodiment of the invention depicted in FIG. 4.
Figure 6B:
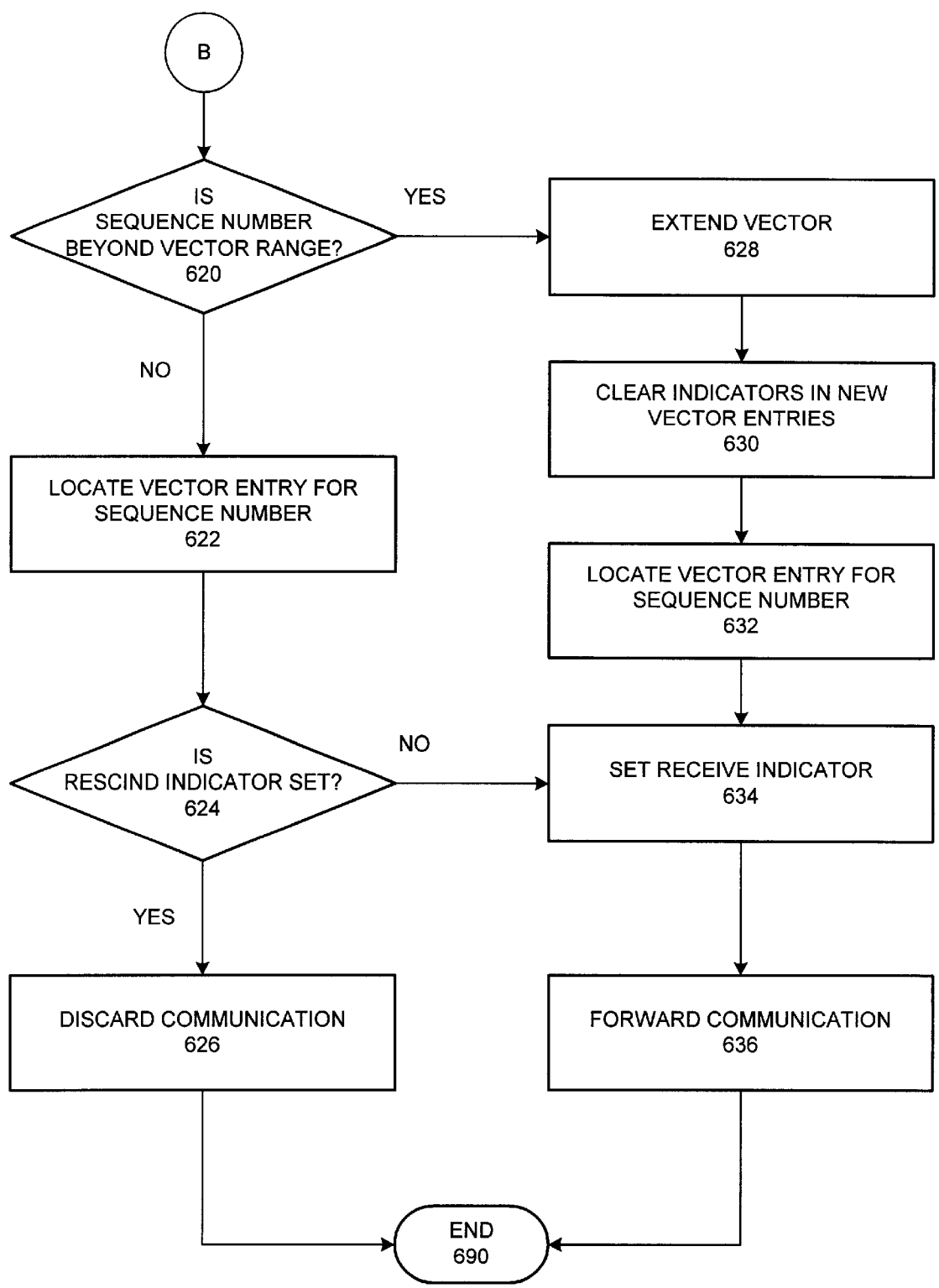
Figure 6C:
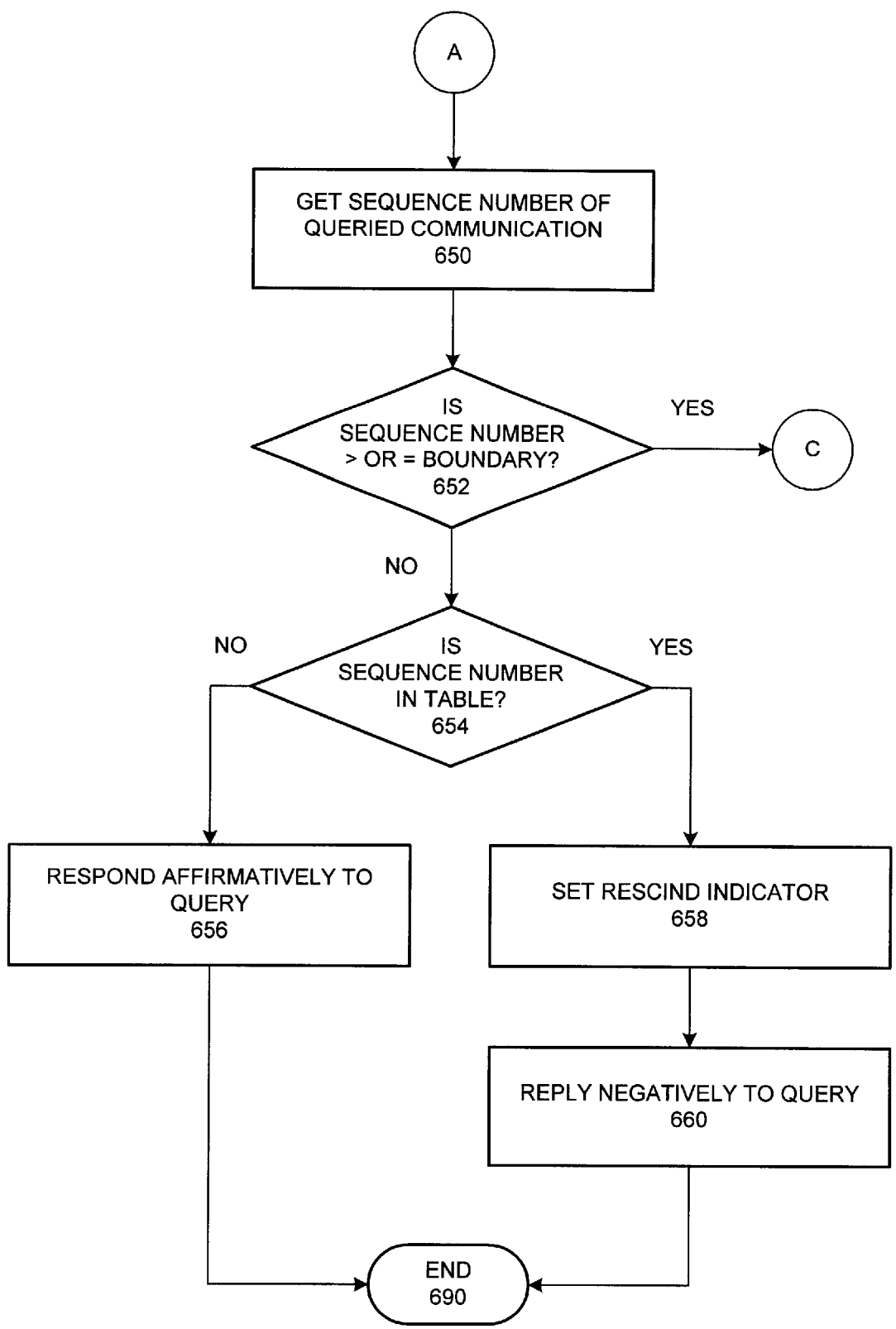
Figure 6D:
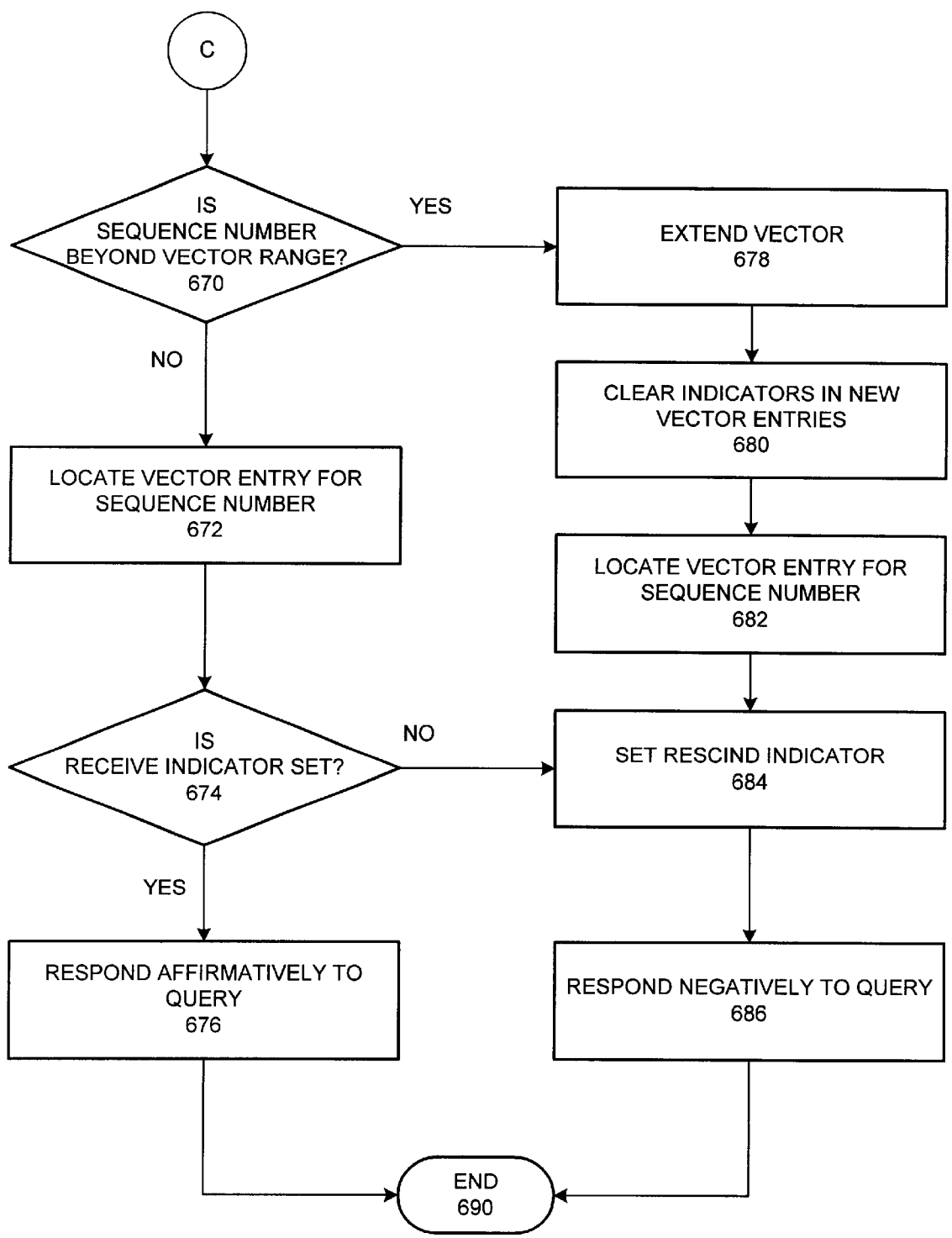
Figure 7A:
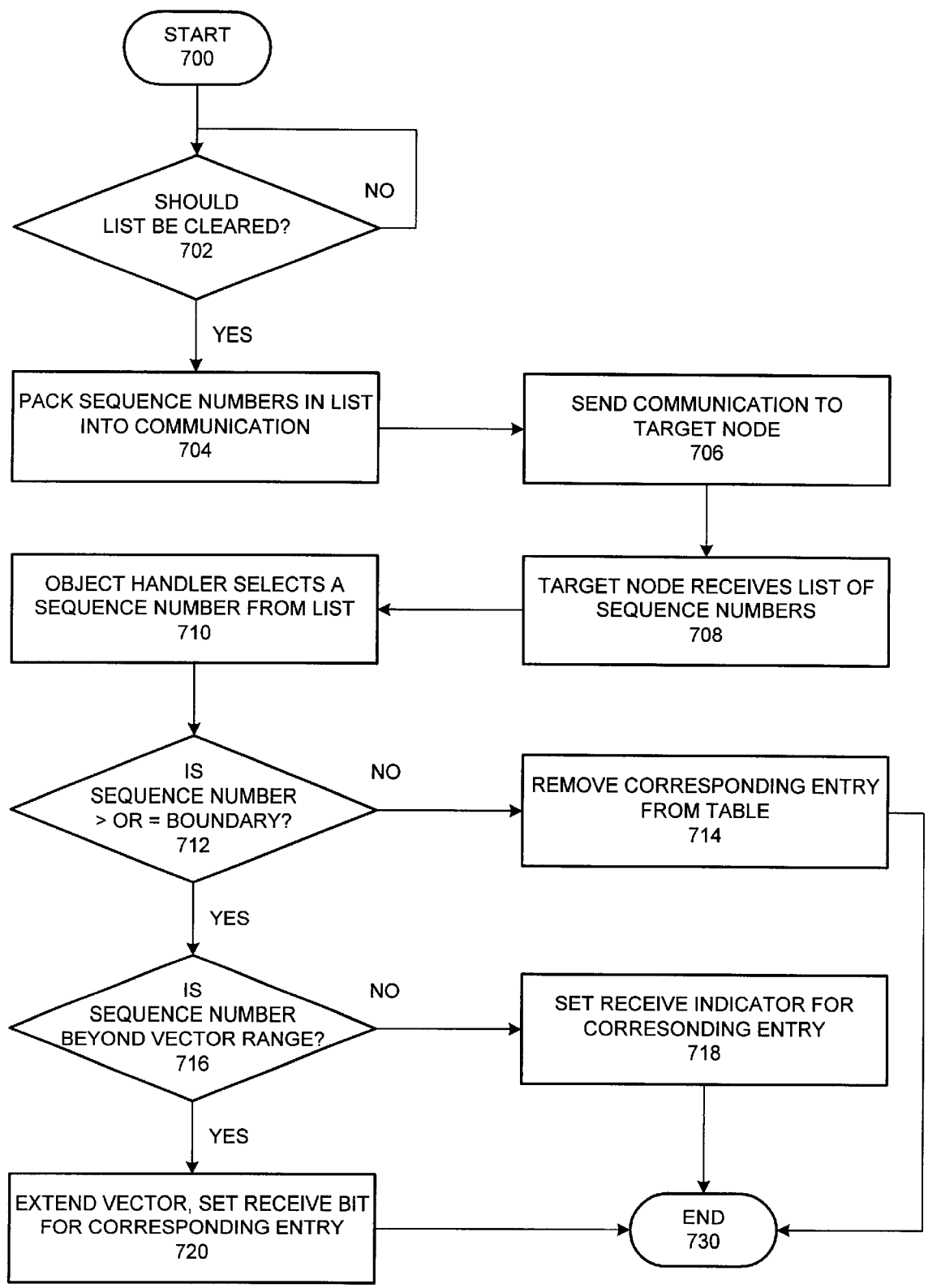
FIGS. 7A–7B are flowcharts demonstrating one method of managing memory resources to facilitate the operation of a system for ensuring delivery of a single communication from one node to another node according to the alternative embodiment of the invention depicted in FIG. 4.
Figure 7B:
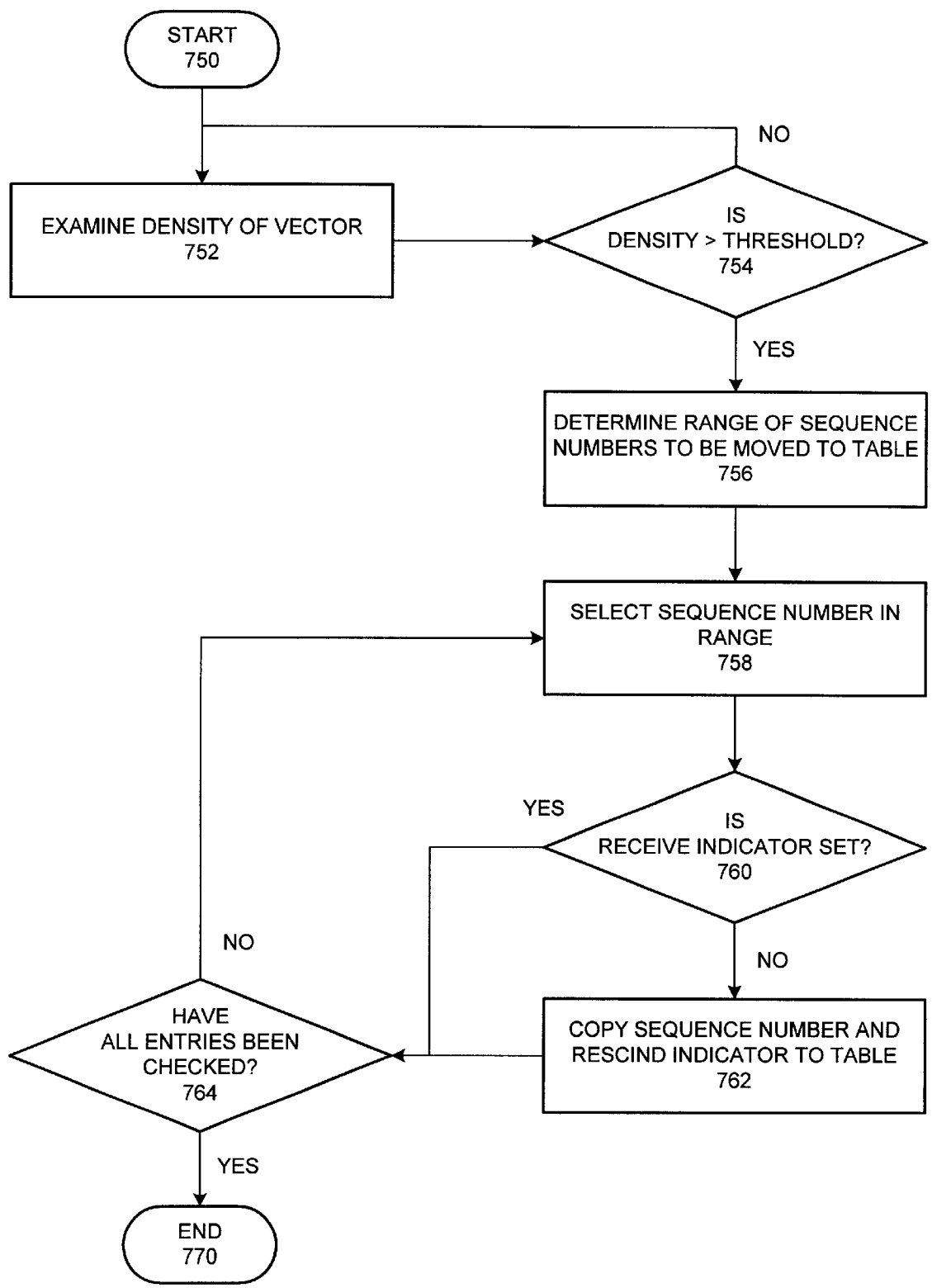

Methods of employing node 400 and node 402 in a present embodiment of the invention to ensure delivery of a single version of a communication from node 400 to node 402 are now described with reference to FIGS. 5–7. FIGS. 5A–5B demonstrate a method of operating node 400 to ensure delivery of a communication sent from node 400, while FIGS. 6A–6D demonstrate a cooperative method of operating node 402 to ensure receipt of just one version of the communication. FIGS. 7A–7B demonstrate an illustrative method of performing a memory management or garbage collection task to clean up memory usage on nodes 400 and 402. In these illustrative procedures, individual communications sent from one node to another are identified by sequence numbers. However, in alternative embodiments of the invention alternative identifiers are used (e.g., labels, alphanumeric identifiers).

In FIGS. 5A–5B, node 400 in FIG. 4 originates a communication to node 402. State 500 is a start state in which a higher level service operating on node 400 (e.g., a file system) passes to an object handler a communication request. The communication request may refer to an object stored on or accessible through node 402.

In state 502 the object handler generates a communication in accordance with the request of the higher level service. The structure or format of the communication may adhere to a proprietary design for computer nodes in a particular environment (e.g., a highly available cluster) or, alternatively, may be structured according to a standard communication protocol.

In state 504 the object handler retrieves the next sequence number for use with the communication. Illustratively, the next sequence number is stored in a register for easy retrieval. Each time an object handler retrieves the stored sequence number for use with an outgoing communication, it automatically increments and stores the incremented value for retrieval for the next communication.

In state 506 the object handler compares the retrieved sequence number to all sequence numbers stored in a table of unusable sequence numbers, such as table 412 of FIG. 4. As described above, the sequence numbers in this table are considered unusable because they were previously assigned to communications that were sent from node 400 but were reported by the destination nodes as not being received. In particular, each communication corresponding to a sequence number stored in the table was reported as successfully sent from the node (e.g., by a transport module) but no acknowledgement was received from the destination node. The object handler therefore queried the destination to determine if the communication was received, but the destination node replied in the negative. Therefore, the communication may have been delayed or lost in transit. In any event, node 400 should not assign the same sequence number to another communication because, as described above, node 402 will be prepared to discard any communication having the sequence number.

If the retrieved sequence number matches a sequence number in the table of unusable sequence numbers, the procedure returns to state 504 to select a new sequence number. Otherwise, the procedure continues at state 508.

In one embodiment of the invention the retrieved sequence number is also compared against a list of identifiers of un-transmitted communications (e.g., list 414 of FIG. 4). This comparison ensures that none of these identifiers is re-used—at least not until a memory management procedure (described below) is applied to clean up the list and notify a destination node that the identifiers were not actually used with any communications. In one alternative embodiment of the invention in which this management procedure is performed on a regular basis, the list will be cleared before the identifiers "wrap-around" (i.e., start over) and thus there should be no danger of using an identifier of an un-transmitted communication.

In state 508 the sequence number is assigned to (e.g., incorporated into) the communication addressed to node 402.

In state 510 the communication is passed to a transport module (described in a previous section) for transmission to node 402.

In state 512 the object handler examines the status of the communication. If the communication was successful (e.g., an acknowledgement was received from node 402), the illustrated procedure ends at state 590. If the communication failed (e.g., the transport module could not transmit the communication over a communication link), the illustrated procedure continues at state 514. Otherwise, the communication status is considered uncertain (i.e., the transport transmitted the communication but no acknowledgement was received) and the illustrated method proceeds to state 520.

In state 514, the sequence number of the communication is placed into a list of failed communications (e.g., list 414 of FIG. 4).

In state 516 a replacement for the unsuccessful communication is generated and the illustrated procedure returns to state 504 to select a new sequence number.

In state 520 the object handler generates a query to node 402 concerning the communication, in order to determine if node 402 (e.g., an object handler on node 402) received the communication. Illustratively, the communication identifies the sequence number of the uncertain communication, but is not assigned a sequence number itself before being sent.

In state 522 a response to the query is received by the object handler.

In state 524 the object handler examines the response to determine if the status of the communication should be changed to success or failure. If node 402 replied that the communication was received, then the procedure ends at end state 590.

Otherwise, if node 402 responded that the communication had not been received by the time the query was received, in state 526 the sequence number of the communication is placed in table 412 of unusable sequence numbers. After state 526, the illustrated procedure returns to state 516 to generate a new communication to replace the failed one.

One of ordinary skill in the art will appreciate that the procedure depicted in FIGS. 5A–5B is merely one method by which a sending node may ensure that a communication it sent was received by the destination node. Other methods and procedures may be derived from the illustrated procedure without exceeding the scope of the invention.

FIGS. 6A–6D depict a procedure according to one embodiment of the invention, in which node 402 receives a communication from node 400 or a query concerning a communication sent previously from node 400 to node 402. State 600 is a start state.

In state 602 a communication (or a query concerning a communication) is received from node 400 at an object handler operating on node 402.

In state 604 the object handler determines whether the communication is requesting the status of a previous communication sent to node 402 from node 400. If so, the illustrated procedure continues at state 650 (FIG. 6C). Otherwise, a new communication has been received from node 400 and the procedure continues at state 606.

In state 606 the object handler retrieves the sequence number of the communication from the communication.

In state 608 the object handler compares the communication sequence number to a boundary sequence number (e.g., stored in boundary identifier 424). As described previously, node 402 maintains two data structures to track the status of communications sent by node 400. A vector (e.g., vector 420 of FIG. 4) contains entries indicating the status of more recent communications, with each entry pertaining to one communication. A table (e.g., vector 422 of FIG. 4) contains individual entries for older communications that were not received.

In particular, a vector entry contains one indicator revealing whether node 402 has received the corresponding communication and another indicator to show whether node 400 queried the status of the corresponding communication before the communication was received, in which case the communication is considered rescinded by node 400. At periodic intervals older entries in the vector reflecting non-received communications are moved to the table. In this embodiment of the invention node 402 stores a boundary sequence number identifying the sequence number associated with the bottom or oldest entry in the vector. Thus, in state 608 the object handler determines whether the sequence number of the newly received communication should be in the table or in the vector. If the sequence number of the communication is less than that stored in the boundary identifier, the object handler proceeds to state 610 to examine the table. Otherwise the illustrated procedure continues at state 620.

In state 610 the object handler locates the table entry for the sequence number. If the communication sequence number is below the boundary sequence number, the sequence number should be in the table unless some error has occurred, since the hash table only stores sequence numbers of (older) communications that have not been received. In this embodiment of the invention each table entry includes, at a minimum, a sequence number and a rescind indicator that indicates whether node 400 has rescinded the communication. As explained above, a communication is considered rescinded if node 400 queries node 402 to determine if node 402 received the communication and an object handler on node 402 has not yet received the communication at the time of the query. Node 400 will automatically generate and send a replacement communication; therefore the old communication is considered rescinded and is to be discarded if received after the query from node 400.

In state 612 the object handler examines the rescind indicator associated with the table entry. If the rescind indicator is set (e.g., indicating that the communication has been rescinded), the object handler discards the communication in state 614 and exits the procedure at end state 690.

Otherwise, if the rescind indicator of the table entry is clear (e.g., the communication has not been rescinded), in state 616 the table entry is deleted. In this embodiment of the invention only non-received communications are noted in the table. Thus, when a corresponding communication is received, the table entry is no longer needed.

In state 618 the communication is forwarded (e.g., sent up to a higher level service such as a file system). The procedure then ends at end state 690.

The illustrated procedure reaches state 620 when the sequence number of a communication from node 400 is greater than or equal to the sequence number associated with the bottom or oldest entry in the vector. In state 620 the object handler determines whether the sequence number of the received communication is beyond the current range of the vector. If the sequence number is higher than the sequence number of the top or newest entry in the vector, then the vector must be extended and the procedure continues at state 628.

Otherwise, the current vector range includes the sequence number of the received communication and, in state 622, the corresponding entry is located.

In state 624 the object handler examines the rescind indicator of the vector entry. Illustratively, if the rescind indicator is set (e.g., equal to one) then the communication has already been rescinded, in which case the communication is discarded in state 626 and the procedure exits at end state 690. If, however, the rescind indicator is not set, then the procedure advances to state 634.

In state 628 the vector must be extended to cover the received communication. In one embodiment of the invention the vector is extended by simply adding or allocating additional memory. The vector may thus be composed of multiple segments that are added as needed.

In state 630 the indicators in each entry of the new vector segment are cleared (e.g., set to zero). In this embodiment of the invention, when both indicators of a vector entry are clear this is interpreted to indicate that a communication having the sequence number associated with the vector entry was neither received nor rescinded.

In state 632 the object handler locates the new vector entry associated with the sequence number of the communication.

In state 634, the receive indicator of the vector entry for the communication is set. State 634 is entered from either state 624 or state 632, and in neither case should the receive indicator already be set, unless some error has occurred (which may require re-initialization of the system).

After setting the received indicator to indicate that the communication was received, in state 636 the communication is forwarded to a higher level service for action and the illustrated procedure ends at end state 690.

In state 650 the object handler on node 402 has identified the received communication as a query from node 400. In particular, node 400 is inquiring whether a previous communication (e.g., identified by sequence number) has been received by node 402 (e.g., the object handler). Thus, in state 650 the object handler retrieves the sequence number of the previous communication from the query.

In state 652 the object handler compares the sequence number of the queried communication to the boundary sequence number to determine whether the table or the vector should be examined to find the status of the communication. If the sequence number is less than the boundary sequence number the procedure continues at state 654. Otherwise it advances to state 670.

In state 654 the object handler determines whether the sequence number is in the table. As discussed above, only communications that have not yet been received by the object handler are reflected in the table. If the sequence number is in the table, the illustrated procedure continues at state 658.

Otherwise, the sequence number is not in the table, thus indicating that the queried communication has already been received. Thus, in state 656 the object handler responds affirmatively to the query from node 400 and then ends the procedure in end state 690.

In state 658 the object handler sets the rescind indicator in the table entry corresponding to the queried communication. Illustratively, node 400 will send a replacement communication after being notified that the queried communication was not received. Therefore, the original communication should not be accepted; if it later is received, it will be discarded as described above.

In state 660 the object handler responds to the query with a negative answer and the procedure ends with end state 690.

State 670 of the illustrated procedure is reached when a query is received concerning a previous communication from node 400 with a sequence number beyond the boundary sequence number. In state 670 the object handler determines whether the sequence number of the queried communication is beyond the current range of the vector. If so, the procedure continues at state 678.

Otherwise, an entry for the communication is already in the vector and, in state 672, the corresponding entry is located.

In state 674 the object handler determines whether the receive indicator in the vector entry is set. If so, then the communication has been received and, in state 676, the object handler returns to node 400 an affirmative response to the query and the procedure ends at end state 690. However, if the receive indicator of the vector entry is not set, then the procedure advances to state 684.

In state 678 the vector must be extended to cover the queried communication. Illustratively, a new memory block or segment is added to the head or top of the vector.

In state 680 the indicators in all of the new vector entries are cleared (e.g., zeros are stored) and, in state 682, the vector entry corresponding to the queried communication is located.

In state 684 the rescind indicator in the vector entry corresponding to the queried communication is set. As a result, if the communication is later received, it will be discarded, as described above.

In state 686 the object handler returns a negative response to node 400 and the procedure then ends at state 690.

One of ordinary skill in the art will appreciate that the procedure depicted in FIGS. 6A–6D is merely one method by which a receiving node may receive or verify receipt of a communication sent from another node. Other methods and procedures may be derived from the illustrated procedure without exceeding the scope of the invention.

FIGS. 7A–7B depict exemplary methods of managing or cleaning up the various data structures used in the embodiment of the invention illustrated in FIG. 4. In this embodiment of the invention a sending node periodically notifies a receiving node of the sequence numbers of communications that were not successfully transmitted (e.g., the sequence numbers in list 414 of node 400 in FIG. 4). The receiving node then marks those communications as received, so that it may clean up or rearrange its vector and table (e.g., vector 420 and table 422 of node 402 of FIG. 4). An illustrative procedure for performing this memory management is depicted in FIG. 7A. FIG. 7B depicts an illustrative procedure in which a receiving node periodically moves or transfer entries from a vector (e.g., vector 420) to a table (e.g., table 422) over time.

In FIG. 7A, state 700 is a start state. In state 700 the sending node, such as node 400 of FIG. 4 sends communications to one or more target nodes, including node 402.

In state 702 node 400 (e.g., an object handler operating on the node) determines whether it should clear its list of sequence numbers of un-transmitted communications (e.g., list 414 of FIG. 4). Various criteria may be applied to determine when this should be done. In one embodiment of the invention the list should be cleared after a predetermined number of communications have been initiated or transmitted. In other embodiments the list may be cleared based on how much time (e.g., several seconds) elapsed from the last clearing operation or how many sequence numbers are accumulated in the list.

In state 704 the sequence numbers in the list are packed into a communication addressed to receiving node 402. Illustratively, the communication is assigned a sequence number so that node 400 may determine for certain that the sequence numbers were received by node 400 and that the list may be cleared.

In state 706 the communication is transmitted toward node 402 (e.g., by a transport module of node 400).

In state 708 receiving node 402 (e.g., an object handler on node 402) retrieves the sequence numbers from the communication. Node 402 should acknowledge receipt of the communication so that node 400 may clear its list. Also, node 402 will note receipt of the communication as described above in conjunction with FIGS. 6A–6D.

In state 710 node 402 selects a sequence number from the list and, in state 712, determines whether the sequence number corresponds to an entry in its table (e.g., table 422) or vector (e.g., vector 420) by comparing the sequence number against a boundary sequence number (e.g., stored in boundary identifier 424).

If the sequence number is lower than the boundary then the corresponding entry in the table is located and deleted in state 714, after which the illustrated procedure exits in state 730. Because the sequence number corresponds to a communication that was never sent by node 400, there should be an entry in the table if the sequence number is lower than the boundary sequence number. If not, then some error has occurred that may require re-initialization of the communication scheme.

In state 716 the sequence number is greater than or equal to the boundary sequence number and the object handler determines whether the sequence number is beyond the current range of the vector. If not, the receive indicator for the vector entry for the corresponding vector entry is set in state 718 and the procedure exits in end state 730.

In state 720, the sequence number is beyond the range of the vector, so the vector is extended (e.g., by adding another segment) and the receive indicator of the entry corresponding to the sequence number is set so that it will appear that the associated communication was received. Indicators in the other new vector entries are cleared. The illustrated procedure then exits in end state 730.

FIG. 7A depicts the application of the illustrated procedure to just one sequence number, selected in state 710. In one implementation of the procedure, however, after states 714, 718 and 720 it is determined whether all of the sequence numbers in the list have been taken care of. The procedure then returns to state 710 to select another one if not yet finished, but continues to end state 730 if all sequence numbers have been acted on.

State 750 of FIG. 7B is a start state for an illustrative procedure in which a receiving node such as node 402 reduces the size of a vector (e.g., vector 420) by moving or translating entries into a table (e.g., table 422).

In state 752 receiving node 402 examines the density or state of a selected number of entries at the rear or bottom of the vector. Illustratively, the number of entries examined at one time may correspond to one vector segment (e.g., 32 entries, 64K of memory space) or some predetermined number of vector entries. In the illustrated embodiment of the invention the density of the selected area of the vector is measured by dividing the number of entries in the selected area that have an indicator set (e.g., the receive or rescind indicator) by the total number of entries in the selected area. Alternatively, density may be determined by simply noting how many entries in a selected region have an indicator set. In the presently described embodiments of the invention density is measured by examining both the receive and rescind indicators. In one alternative embodiment of the invention, however, only receive indicators are examined.

In state 754 the density is compared to a threshold. If the density of indicators set within the selected region is greater than the threshold (e.g., 94% of receive indicators set), then the illustrated procedure continues at state 756. Otherwise the procedure returns to 752 to examine the vector again at another time.

In state 756 the range of vector entries to be shifted to a table is determined. In one embodiment of the invention the range of entries matches the region tested in state 752.

In state 758 a sequence number within the range of entries is selected. Illustratively, each entry in the range is selected in turn for the following actions, possibly from the oldest entry (e.g., identified by the boundary sequence number) to the newest entry in the range.

In state 760 the status of the receive indicator for the selected entry is examined. If it is set (e.g., equal to one or true), indicating that the associated communication has been received by node 402, then the procedure continues to state 764. In this case the sequence number is not to be placed in the table. Otherwise, if the receiving indicator is clear (e.g., equal to zero or false) then the procedure continues at state 762.

In state 762 the sequence number of the selected entry is placed in an entry in the table, along with the status of the rescind indicator.

In state 764 it is determined whether all entries in the selected range have been considered for transfer to the table. If not, the illustrated procedure returns to state 758 to select another entry. Otherwise, the procedure exits at end state 770.

One of ordinary skill in the art will appreciate that the procedures depicted in FIGS. 7A–7B merely demonstrate illustrative methods for nodes to clean up, rearrange or manage the data structures used in the presently described communication scheme. Other methods and procedures may be derived from the illustrated procedures without exceeding the scope of the invention.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of delivering a message from a first node to a second node in a multi-node computing environment, the first node including a first memory and the second node including a second memory, wherein said first memory and said second memory are configured to store identifiers associated with a subset of messages generated by the first node for delivery to the second node, the method comprising the steps of:

generating a first message from the first node toward the second node;

selecting a first identifier for said first message;

attempting to transmit said first message from the first node to the second node;

if said first message is received at the second node:
  searching said second memory for said first identifier; and
  if said first identifier does not match any identifier stored in said second memory, updating a status memory on the second node, wherein said status memory is configured to indicate delivery statuses of multiple messages generated by the first node for the second node;

sending a query message from the first node to the second node to determine if said first message was received by the second node, wherein said query message includes said first identifier; and sending a repeat of said first message from the first node to the second node if a response to said query message is negative, wherein an identifier different from said first identifier is associated with said repeat message.

2. The method of claim 1, further comprising the step of receiving a query response indicating whether said first message was received by the second node.

3. The method of claim 1, further comprising the step of storing said first identifier in said first memory.

4. The method of claim 1, further comprising the step of storing said first identifier in said second memory.

5. The method of claim 4, further comprising the step of:
if said message is received at the second node after said storing, discarding said message at said second node.

6. The method of claim 1, wherein said generating comprises the steps of:
if said first identifier matches one of said identifiers in said first memory:
selecting a second identifier for said first message; and
assigning said second identifier to said first message.

7. The method of claim 1, further comprising the steps of:
generating a second message from the first node to the second node;
selecting a second identifier;
comparing said second identifier with said identifiers in said first memory; and
assigning said second identifier to said second message if said second identifier does not match any of said identifiers in said first memory.

8. The method of claim 1, further comprising the step of:
if the first node is re-initialized, clearing said first memory and said second memory.

9. The method of claim 1, further comprising the step of:
maintaining a third memory on the first node and a fourth memory on the second node, wherein said third memory and said fourth memory are configured to indicate statuses of a predetermined number of messages sent from the first node to the second node.

10. The method of claim 9, wherein said third memory is a series of status indicators, each said status indicator having a first value if a status of a corresponding message is success and a second value otherwise.

11. The method of claim 1, wherein said generating comprises the steps of:
receiving a reference to an object accessible by the second node;
creating a message for delivery to the second node; and
identifying said object in said message.

12. The method of claim 1, wherein said updating comprises the steps of:
accessing a message mask on the second node, wherein said message mask comprises a series of indicators, each indicator indicating a status of a corresponding message from said first node to said second node;
locating a first indicator in said message mask, said first indicator indicating a status of said first message; and
changing a value of said first indicator from a second value to a first value.

13. The method of claim 1, further comprising the steps of:
receiving at the second node a new message from the first node, said new message having a second identifier; and
if said second identifier matches an identifier stored in said second memory, discarding said new message.

14. A computer readable storage medium storing instructions that, when executed by a computer, cause the computer to perform a method of delivering a message from a first node to a second node in a multi-node computing environment, the first node including a first memory and the second node including a second memory, wherein said first memory and said second memory are configured to store identifiers associated with a subset of messages generated by the first node for delivery to the second node, the method comprising the steps of:
generating a first message from the first node toward the second node;
selecting a first identifier for said first message;
attempting to transmit said first message from the first node to the second node;
if said first message is received at the second node:
searching said second memory for said first identifier; and
if said first identifier does not match any identifier stored in said second memory, updating a status memory on the second node, wherein said status memory is configured to indicate delivery statuses of multiple messages generated by the first node for the second node;
sending a query message from the first node to the second node to determine if said first message was received by the second node, wherein said query message includes said first identifier; and
sending a repeat of said first message from the first node to the second node if a response to said query message is negative, wherein an identifier different from said first identifier is associated with said repeat message.

15. A system for ensuring delivery of a message from a first computer node to a second computer node, comprising:
a first node configured to generate a message for a second node, wherein said message has an identifier, said first node comprising:
a communication module configured to attempt to transmit said message toward said second node;
a first memory configured to store a delivery status of said message; and
a second memory configured to store identifiers of a subset of messages transmitted by said first node toward said second node;
wherein said first node receives a receipt status of said message from said second node; and
wherein said identifier of said message is stored in said second memory if said receipt status is negative.

16. The system of claim 15, wherein said first node further comprises:
a first object handler configured to:
receive an object reference;
generate said message to said second node concerning said object; and
assign said identifier to said message, wherein said identifier is unique from said identifiers stored in said second memory.

17. The system of claim 15, wherein said first node ensures that said identifier is unique in comparison to said identifiers stored in said second memory before assigning said identifier to said message.

18. The system of claim 15, further comprising:
a second node configured to receive said message from said first node, said second node comprising:
a third memory configured to store said receipt status of said message; and
a fourth memory configured to store said identifiers of said subset of messages;
wherein a second object handler in said second node compares said identifier of said message to said identifiers stored in said fourth memory in order to determine whether to discard said message.

19. The system of claim 18, wherein said second object handler is configured to:
   receive said message from said first node;
   retrieve said identifier; and
   forward said object reference to a high-level service.

20. The system of claim 18, wherein said second node is configured to discard said message if said first identifier matches any identifier stored in said fourth memory.

21. The system of claim 18, wherein said second node is configured to update said third memory to indicate successful delivery of said message if said identifier of said message matches no identifier stored in said fourth memory.

22. The system of claim 18, wherein said first memory and said third memory comprise multiple status indicators, each of said status indicators corresponding to a single message generated by first node for said second node.

23. A method of sending a communication from a first node to a second node in a multi-node computing environment, comprising the steps of:
   generating a communication on a first node for transmission to a second node;
   selecting an identifier;
   comparing said identifier to a set of unusable identifiers;
   associating said identifier with said communication if said identifier is not included in said set of unusable identifiers;
   attempting to transmit said communication to the second node;
   sending a query to the second node to determine if the second node received said communication; and
   if a response to said query is negative:
      storing said identifier in said set of unusable identifiers.

24. The method of claim 23, further comprising, if said response is negative, the steps of:
   generating a replacement communication for said communication;
   associating a second identifier with said replacement communication, wherein said second identifier is different from said identifier and is not included in said set of unusable identifiers; and
   attempting to transmit said replacement communication to the second node.

25. The method of claim 23, further comprising, if said attempting fails, the step of storing said identifier in a set of attempted identifiers.

26. The method of claim 23, further comprising the steps of:
   maintaining a first memory on the second node, said first memory comprising multiple entries, wherein each entry in said first memory corresponds to a single communication in a first set of communications generated by the first node and comprises:
      an identifier of said single communication in said first set of communications; and
      a rescind indicator configured to have a first value if the first node has rescinded said single communication in said first set of communications and a second value otherwise; and
   maintaining a second memory on the second node, said second memory comprising multiple entries, wherein each entry in said second memory corresponds to a single communication in a second set of communications generated by the first node and comprises:
      a receive indicator configured to have a first value if said single communication in said second set of communications was received at the second node and a second value otherwise; and
      a rescind indicator configured to have a first value if the first node has rescinded said single communication in said second set of communications and a second value otherwise.

27. The method of claim 26, further comprising the steps of:
   receiving said communication at the second node;
   extracting said identifier from said communication;
   determining whether a status of said communication is reflected in said first memory or said second memory;
   if said communication status is reflected in said first memory:
      locating an entry for said communication in said first memory;
      if said rescind indicator of said located entry in said first memory has said first value, discarding said communication; and
      if said rescind indicator of said located entry in said first memory has said second value, removing said entry from said first memory; and
   if said communication status is reflected in said second memory:
      locating an entry for said communication in said second memory;
      if said rescind indicator of said located entry in said second memory has said first value, discarding said communication; and
      if said rescind indicator of said located entry in said second memory has said second value, setting said receive indicator of said located entry in said second memory to said first value.

28. The method of claim 27, wherein neither said first memory nor said second memory includes said communication status, further comprising the steps of:
   extending said second memory;
   locating an entry for said communication in said extended second memory; and
   assigning said first value to said receive indicator of said located entry in said extended second memory.

29. The method of claim 27, wherein said determining whether a status of said communication is stored in said first memory or said second memory comprises the step of:
   comparing said identifier of said communication to a boundary identifier stored on the second node.

30. The method of claim 29, wherein said identifier is a number and wherein said determining whether a status of said communication is stored in said first memory or said second memory further comprises the steps of:
   if said identifier is less than said boundary identifier, then said communication status is in said first memory; and
   if said identifier is greater than said boundary identifier and said identifier is less than a highest sequence number of a communication having a status in said second memory, then said communication status is in said second memory.

31. The method of claim 26, further comprising the steps of:
   receiving said query at the second node;
   extracting said identifier from said query;
   determining whether a status of said communication is reflected in said first memory or said second memory;

if said communication status is reflected in said first memory:
  searching for an entry for said communication in said first memory;
  if said search is unsuccessful, sending a positive response to said query to the first node; and
  if said search is successful, setting said rescind indicator of said entry for said communication in said first memory to said first value and sending a negative response to said query to the first node; and
if said communication status is reflected in said second memory:
  locating an entry for said communication in said second memory;
  if said receive indicator of said located entry in said second memory has said first value, sending a positive response to said query to the first node; and
  if said receive indicator of said located entry in said second memory has said second value, setting said rescind indicator of said located entry in said second memory to said first value and sending a negative response to said query to the first node.

32. The method of claim 31, wherein neither said first memory nor said second memory reflects said communication status, further comprising the steps of:
  extending said second memory;
  locating an entry for said communication in said extended second memory;
  assigning said first value to said rescind indicator of said located entry in said extended second memory; and
  sending a negative response to said query to the first node.

33. The method of claim 26, further comprising the steps of:
  generating a management communication on the first node for delivery to the second node;
  including said set of attempted identifiers in said management communication; and
  clearing said set of attempted identifiers.

34. The method of claim 33, further comprising the steps of:
  receiving said management communication on the second node;
  retrieving a first attempted identifier from said set of attempted identifiers;
  determining whether a status of a failed communication corresponding to said first attempted identifier is reflected in said first memory or said second memory of the second node;
  if said failed communication status is reflected in said first memory:
    locating an entry for said failed communication in said first memory; and
    removing said located entry from said first memory; and
  if said failed communication status is reflected in said second memory:
    locating an entry for said failed communication in said second memory; and
    setting said receive indicator of said located entry in said second memory to said first value.

35. The method of claim 34, wherein neither said first memory nor said second memory includes said failed communication status, further comprising the steps of:
  extending said second memory;
  locating an entry for said failed communication in said extended second memory; and
  setting said receive indicator of said located entry in said extended second memory to said first value.

36. The method of claim 26, further comprising the steps of:
  selecting a portion of said second memory;
  determining a density of said selected portion of said second memory, wherein said density indicates a proportion of entries in said selected portion having one of said receive indicator and said rescind indicator set to said first value;
  selecting a first entry in said selected portion;
  examining said receive indicator of said first entry;
  if said receive indicator of said first entry has a value other than said first value:
    determining an associated identifier of a communication corresponding to said first entry;
    storing said associated identifier in a new entry in said first memory; and
    setting said rescind indicator of said new entry in said first memory to the value of said rescind indicator of said first entry in said second memory; and
  removing said selected portion of said second memory from said second memory.

37. A system for ensuring delivery of a communication from one computer node to another computer node, comprising:
  a first node, comprising:
    a first memory configured to store a first identifier for association with a first communication sent from said first node; and
    a second memory configured to store a set of unusable identifiers associated with communications rescinded by said first node, wherein said first identifier is compared against each of said unusable identifiers before being associated with said first communication; and
  a second node, comprising:
    a first memory configured to store statuses of a first set of communications generated by said first node, wherein each said status indicates whether a corresponding communication was received by said second node and whether said corresponding communication was rescinded by said first node; and
    a second memory configured to indicate whether any of a second set of communications generated by said first node were rescinded by said first node, wherein none of the communications in said second set were received by said second node;
  wherein said first set of communications and said second set of communications are mutually exclusive;
  wherein said first communication is rescinded by said first node if, before said second node receives said first communication, said second node is queried by said first node as to whether said second node received said first communication; and
  wherein said first identifier becomes an unusable identifier if said first communication is rescinded by said first node.

38. The system of claim 37, wherein said first node further comprises:
  a third memory configured to store a set of failed identifiers assigned to communications that failed to be transmitted from said first node.

39. The system of claim 37, wherein said first memory of said second node comprises:
  a first indicator configured to indicate whether said corresponding communication was received by said second node; and a second indicator configured to indicate whether said corresponding communication was rescinded by said first node.

40. The system of claim 37, wherein said second memory of said second node comprises:

an identifier assigned to a second corresponding communication; and a rescind indicator configured to indicate whether said second corresponding communication was rescinded by said first node.

41. The system of claim 37, wherein said second node further comprises:

a third memory configured to store an identifier assigned to a boundary communication, wherein said boundary communication divides said first set of communications from said second set of communications.

42. A computer readable storage medium containing a data structure configured for indicating a status of a communication generated by a first node for a second node, the data structure comprising:

a first segment of computer manipulable memory, said segment comprising:
a series of status entries, wherein each of said entries corresponds to a single communication generated by the first node for delivery to the second node, each entry comprising:
a first indicator configured to indicate whether a communication corresponding to said entry was received by the second node; and
a second indicator configured to indicate whether said communication corresponding to said entry was rescinded by the first node;
wherein said series of status entries is indexed by identifiers ranging from a lower identifier to an upper identifier, said identifiers configured to identify said communications corresponding to said status entries; and
wherein a second segment of computer manipulable memory is logically adjoined to said first segment if a first communication received from the first node is associated with a first identifier not within said range of said lower identifier to said upper identifier.

43. The computer readable storage medium of claim 42, wherein said data structure further comprises:

a set of rescindable entries, wherein each of said rescindable entries corresponds to a single communication generated by the first node for delivery to the second node but not received by the second node, each rescindable entry comprising:
an identifier of said communication not received by the second node; and
a third indicator configured to indicate whether said communication not received by the second node was rescinded by the first node.

44. The computer readable storage medium of claim 43, wherein a first status entry in said series of status entries is removed from said first segment of computer readable memory and, if said first indicator of said first status entry indicates that a communication corresponding to said first indicator was not received at the second node, a new rescindable entry is added to said set of rescindable entries for said communication corresponding to said first indicator.

45. The computer readable storage medium of claim 44, wherein a value of said third indicator of said new rescindable entry is set according to said second indicator of said first status entry.

46. A computer readable storage medium storing instructions that, when executed by a computer, cause the computer to perform a method of sending a communication from a first node to a second node in a multi-node computing environment, the method comprising the steps of:

generating a communication on a first node for transmission to a second node;

selecting an identifier;

comparing said identifier to a set of unusable identifiers;

associating said identifier with said communication if said identifier is not included in said set of unusable identifiers;

attempting to transmit said communication to the second node;

sending a query to the second node to determine if the second node received said communication; and if a response to said query is negative:
storing said identifier in said set of unusable identifiers.

47. A method of ensuring receipt of a communication from a first node at a second node in a multi-node computing environment, comprising:

receiving a first communication from a first node at a second node;

retrieving from said first communication an identifier of said first communication;

comparing said identifier to a set of rescinded identifiers;

if said identifier matches one of said rescinded identifiers, discarding said first communication; and if none of said rescinded identifiers match said identifier, updating a status memory configured to indicate statuses of multiple communications generated by the first node, including said first communication.

48. The method of claim 47, further comprising:

receiving from the first node a status query regarding said first communication;

examining said status memory to determine a status of said first communication; and responding affirmatively to said status query.

49. The method of claim 47, further comprising:

receiving from the first node a status query regarding a second communication;

examining said status memory to determine a status of said first communication; and adding an identifier of said second communication to said set of rescinded identifiers.

50. The method of claim 47, wherein said status memory includes, for each communication in said multiple communications, a corresponding entry comprising:

a receive indicator configured to indicate whether the communication was received at the second node; and a rescind indicator configured to indicate whether the first node rescinded the communication;

wherein a maximum of one of said receive indicator and said rescind indicator can be set.

51. The method of claim 50, wherein updating said status memory comprises:

setting said receive indicator in said entry corresponding to said first communication.

52. The method of claim 50, wherein updating said status memory comprises:

deleting said entry corresponding to said first communication.

* * * * *